(12) United States Patent
Tamura

(10) Patent No.: US 8,006,437 B2
(45) Date of Patent: Aug. 30, 2011

(54) GLASS RUN CHANNEL ASSEMBLY

(75) Inventor: Tatsuya Tamura, Aichi (JP)

(73) Assignee: Tokai Kogyo Co., Ltd, Obu (JP)

( * ) Notice: Subject to any disclaimer, the term of this patent is extended or adjusted under 35 U.S.C. 154(b) by 124 days.

(21) Appl. No.: 12/434,234

(22) Filed: May 1, 2009

(65) Prior Publication Data

US 2009/0278379 A1 Nov. 12, 2009

(30) Foreign Application Priority Data

May 9, 2008 (JP) ................................ 2008-124062

(51) Int. Cl.
  *B60J 1/08* (2006.01)
  *B60J 5/04* (2006.01)
(52) U.S. Cl. ....................... 49/440; 296/146.2
(58) Field of Classification Search .............. 296/93, 296/146.15, 200, 146.2; 49/441, 479.1, 440, 49/428, 502; *B60J 1/08, 5/04*
  See application file for complete search history.

(56) References Cited

U.S. PATENT DOCUMENTS

| | | | |
|---|---|---|---|
| 5,651,217 A * | 7/1997 | Mesnel | 49/441 |
| 5,743,047 A * | 4/1998 | Bonne et al. | 49/490.1 |
| 5,916,075 A * | 6/1999 | Tanaka et al. | 49/441 |
| 6,021,609 A | 2/2000 | Teishi | |
| 6,644,718 B2 * | 11/2003 | Nozaki | 296/146.9 |
| 6,708,450 B2 * | 3/2004 | Tanaka et al. | 49/441 |
| 2002/0184826 A1 | 12/2002 | Nozaki | |
| 2006/0064936 A1 | 3/2006 | Shiraiwa et al. | |
| 2006/0141208 A1 | 6/2006 | Takase et al. | |

FOREIGN PATENT DOCUMENTS

JP  A-2000-280749  10/2000

* cited by examiner

*Primary Examiner* — Glenn Dayoan
*Assistant Examiner* — SunSurraye Westbrook
(74) *Attorney, Agent, or Firm* — Oliff & Berridge, PLC

(57) ABSTRACT

A glass run channel assembly is provided. In the glass run channel assembly, after being mounted, an elastic force is generated in a vertical side portion which contacts a vertical frame of a door frame, and an elastic force is generated in an upper side portion which contacts an upper frame of the door frame. Here, the cross-sectional shapes of the upper side portion and the vertical side portion are adjusted such that the frictional force per unit length obtained by multiplying a coefficient of static friction of the upper side portion with the upper frame by the elastic force is larger than a frictional force per unit length obtained by multiplying the coefficient of static friction of the vertical side portion with the vertical frame by the elastic force.

15 Claims, 9 Drawing Sheets

GLASS RUN CHANNEL ASSEMBLY

BACKGROUND OF THE INVENTION

1. Field of the Invention

The present invention relates to a glass run channel assembly mounted to a door frame of a vehicle.

2. Description of the Related Art

Generally, a door frame (also referred to as a sash) provided in a main body of a door panel of a slide door, a front door, a rear door, or the like in a vehicle, such as a car, is mounted with a glass run channel assembly (referred to as a glass run, a glass run channel, a guide member, etc.). The glass run channel assembly for this application is a groove forming member (long molding member) which is molded long and has a substantially U-shape cross-section, and is mounted to a groove formed in a door frame, thereby guiding lifting of a windowpane which moves up and down inside a door. Generally, the glass run channel assembly is manufactured by performing extrusion molding or the like by using an elastic polymeric material, such as rubber or thermoplastic elastomer. For example, JP-A-2000-280749 describes a glass run channel which is formed in whole from a rubber material composed mainly of EPDM (ethylene propylene diene rubber) or TPE (thermoplastic elastomer).

Generally, in a glass run channel which is extrusion-molded using an extrusion molding material including a rubber material like EPDM, the specific gravity of the rubber that is a molding material is about 1.1 to 1.3. This molding material has a drawback that the weight per unit volume becomes larger than a glass run channel manufactured in the same shape by a soft olefin system thermoplastic elastomer (TPO) whose specific gravity is about 0.9 to 1.0.

Meanwhile, the glass run channel made of TPO with advantage of lightweight has the following drawbacks.

(1) The soft olefin system thermoplastic elastomer has larger creep deformation than a soft rubber material. For this reason, when being mounted to the door frame and provided for use, the force of friction against the door frame becomes smaller than that of a glass run channel made of a rubber material if predetermined time (typically, 60 minutes) has lapsed. As a result, the channel deviates in position from the door frame. Although this positional deviation can occur regardless of the front door and rear door of a car, the positional deviation is apt to occur particularly in an inclination frame portion of an upper frame (which refers to an upper frame portion which is formed integrally with an upper end of a vertical frame arranged in a vertical direction along a center pillar of a car, and includes an inclination frame extending along a front pillar or a rear pillar obliquely downward from this upper end (the same hereinbelow)) of a door frame.

(2) The soft olefin thermoplastic elastomer has a larger static friction coefficient against a door frame than, for example, a vulcanized soft rubber. For this reason, resistance at the time of mounting operation to the door frame, specifically, at the time of insertion operation into the groove of the door frame becomes large, and mounting workability becomes inferior. Particularly, when the glass run channel is inserted into the groove of the upper frame of the door frame, an operator has to apply a pressing force upward from below, and from the viewpoint of ergonomics, this operation manner requires an excessive force, and gives excessive burden and fatigue to the operator.

SUMMARY OF THE INVENTION

The present invention was made in order to solve the above problem about this glass run channel assembly for a door frame of a vehicle. One object of the invention is to provide a glass run channel assembly which can realize both achievement of a reduction in weight compared with a glass run channel which is extrusion-molded by using an extrusion molding material including a rubber material as the whole assembly, and prevention of occurrence of positional deviation in the longitudinal direction of a door frame after being mounted to a given position of the door frame.

According to an aspect of the present invention, there is provided the following glass run channel assembly configured to be mounted to a door frame (window frame) of a vehicle.

(1) The long glass run channel assembly is made of an elastic polymeric material, and is capable of being continuously mounted along an inside of a groove of a door frame, the groove being formed between an interior side wall and an exterior side wall arranged substantially parallel to each other in a width direction of a car, the door frame comprising a vertical frame which is arranged in a vertical direction along a center pillar of the car, an upper frame which includes an inclination frame extending obliquely downward along a front pillar or a rear pillar, and a corner frame which integrally connects an upper end of the vertical frame and an end of the upper frame at a side of the center pillar while being made to intersect each other at a predetermined intersection angle, and is configured to guide a windowpane which moves up and down within a door when mounted to the inside of the groove. The glass run channel assembly comprises: a long upper side portion made of a vulcanized elastic rubber whose coefficient of static friction with the door frame is μ1, and mounted along the upper frame of the door frame; a long vertical side portion made of an olefin system thermoplastic elastomer (TPO) whose coefficient of static friction with the door frame is μ2 larger than μ1, and mounted along the vertical frame of the door frame; and a corner portion made of a thermoplastic elastomer and mounted along the corner frame of the door frame. Each of the upper side portion and the vertical side portion comprises: a bottom wall at a position to face an outer peripheral end face of the windowpane; an interior side wall portion protruding from an interior end of the bottom wall in the width direction via a bent interior connection; and an exterior side wall portion protruding from an exterior end of the bottom wall in the width direction via a bent exterior connection. Each of the upper side portion and the vertical side portion is formed by extrusion-molding to have a substantially U-shaped constant cross-section with the bottom wall and both the interior and exterior side wall portions in a state before being mounted to the door frame. Each of the interior side wall portion and the exterior side wall portion has an interior seal lip and an exterior seal lip, each extending in a folded-back shape toward the bottom wall integrally from a protruding tip thereof while holding a space to the side wall portions. When mounted to the door frame, both the upper side portion and the vertical side portion are changed to a shape in which an expansion degree of the U-shape between the interior side wall portion and the exterior side wall portion before mounting is reduced by the elastic deformation of the bent connections. After mounting, an elastic force f2 is generated at a portion of the vertical side portion which contacts the vertical frame of the door frame, and an elastic force f1 is generated at a portion of the upper side portion which contacts the upper frame of the door frame. The cross-sectional shapes of the upper side portion and the vertical side portion are adjusted such that the frictional force per unit length obtained by multiplying the coefficient μ1 of static friction of the upper side portion with the upper frame by the elastic force f1 is larger than a frictional force per unit length obtained by multiplying the coefficient μ2 of static friction of the vertical side portion with the vertical frame by the elastic force f2.

According to the glass run channel assembly of (1), during mounting operation to the door frame, the upper frame of the door frame including the inclination frame is mounted with the upper side portion of the glass run channel assembly, which is made of the elastic rubber Accordingly, in this mounting part, the upper side portion which is made of elastic rubber whose static friction coefficient is lower than that of a conventional glass run channel assembly which is molded from TPO in whole may be mounted. Therefore, the mounting operation to the door frame becomes easy, and the load (fatigue) given to a mounting operator can be made small.

Additionally, in this mounting part, the upper side portion which is made of the above elastic rubber with smaller creep deformation is mounted unlike the glass run channel assembly which is molded from TPO in whole. For this reason, the frictional force generated between the glass run channel assembly (the upper side portion) and the door frame (the upper frame including the inclination frame) can be kept larger than that of a glass run channel assembly which is molded from TPO in whole after lapse of predetermined time after mounting. Accordingly, in this mounting part (the upper frame including the inclination frame), occurrence of an unexpected positional deviation of the glass run channel assembly accompanying the operation of the windowpane which moves up and down can be prevented.

Furthermore, according to the glass run channel assembly of (1), the vertical side portion is formed from a TPO material whose specific gravity is smaller than rubber. For this reason, a reduction in weight can be achieved compared with a glass run channel assembly which is molded from rubber in whole, the mounting operation to the door frame becomes easy (the load to a mounting operator is reduced), and positional deviation of the glass run channel assembly in the upper frame is prevented. In addition, it is possible to enjoy merits (an improvement in efficiency of conveyance, a reduction in the weight of a vehicle, etc.) by virtue of the reduction in weight.

(2) In the glass run channel assembly of (1), the cross-sectional shapes may be adjusted by varying elastic deformation angle (θ) of at least one of the interior side wall portion and the exterior side wall portion when the glass run channel assembly is mounted to the door frame.

(3) In the glass run channel assembly of (2), the elastic deformation angle of at least one of the interior side wall portion and the exterior side wall portion in the upper side portion may be set so as to be larger than any elastic deformation angles of the interior side wall portion and the exterior side wall portion in the vertical side portion.

According to the glass run channel assembly of (3), a larger elastic force than that in the vertical side portion can be generated in the upper side portion. For this reason, according to this configuration, a high frictional force can be generated between the upper side portion of the glass run channel assembly and the upper frame of the door frame including the inclination frame, and occurrence of an unexpected positional deviation of the glass run channel assembly accompanying the operation of the windowpane which moves up and down can be prevented in advance.

(4) In the glass run channel of (3), any elastic deformation angles of the interior side wall portion and the exterior side wall portion in the upper side portion may be set so as to be larger than any elastic deformation angles of the interior side wall portion and the exterior side wall portion in the vertical side portion.

According to the above configuration, much larger elastic force than that in the vertical side portion can be generated in the upper side portion. For this reason, according to this configuration, much higher frictional force than that of the glass run channel assembly of (3) can be generated between the upper side portion of the glass run channel assembly and the upper frame of the door frame including the inclination frame, and occurrence of an unexpected positional deviation of the glass run channel assembly accompanying the operation of the windowpane which moves up and down can be prevented more reliably.

(5) In the glass run channel assembly of (2) or (3), a sum of the elastic deformation angles of the interior side wall portion and the exterior side wall portion in the upper side portion may be set so as to be larger than a sum of the elastic deformation angles of the interior side wall portion and the exterior side wall portion in the vertical side portion.

(6) In the glass run channel assembly of any one of (2) to (5), the upper side portion and the vertical side portion may be connected integrally in the corner portion, and elastic deformation angles in the corner portion before being mounted along the door frame may change so as to become gradually small from elastic deformation angles same as that of the upper side portion to elastic deformation angles same as that of the vertical side portion as approaching from the upper side portion toward the vertical side portion.

In the glass run channel assembly of (6), integrity in the corner portion in the longitudinal direction, and in the vicinity thereof (that is, the end of the upper side portion near the corner portion, and the end of the vertical side portion near the corner portion) is excellent, and mounting operation to the door frame is easy. Additionally, unexpected deformation does not occur in the corner portion during mounting operation.

Therefore, according to the glass run channel assembly of (6), in addition to the effects that are exhibited by the glass run channel assembly of (2) to (5), the effect that the glass run channel assembly can be stably mounted to the whole frame including the corner portion (that is, the corner frame) of the door frame can be obtained.

(7) In the glass run channel assembly of any one of (1) to (6), the cross-sectional shapes may be adjusted such that at least one of an intersection angle between the bottom wall and the exterior side wall portion in the upper side portion, and an intersection angle between the bottom wall and the interior side wall portion in the upper side portion is an obtuse angle in a state before the glass run channel assembly is mounted to the door frame.

In the glass run channel assembly of (7), a larger elastic force than that in the vertical side portion can be generated in the upper side portion. For this reason, according to the glass run channel assembly of (7), a high frictional force can be generated between the upper side portion of the glass run channel assembly and the upper frame of the door frame including the inclination frame, and occurrence of an unexpected positional deviation of the glass run channel assembly accompanying the operation of the windowpane which moves up and down can be prevented in advance.

(8) In the glass run channel assembly of (7), any of the intersection angle between the bottom wall and the exterior side wall portion in the upper side portion, and the intersection angle between the bottom wall and the interior side wall portion in the upper side portion are an obtuse angle.

In the glass run channel assembly of (8), much larger elastic force than that in the vertical side portion can be generated in the upper side portion. For this reason, according to the glass run channel assembly of (8), much higher frictional force than that of the glass run channel assembly of (7) can be generated between the upper side portion of the glass run channel assembly and the upper frame of the door frame including the inclination frame, and occurrence of an unexpected positional deviation of the glass run channel assembly accompanying the operation of the windowpane which moves up and down can be prevented more reliably.

(9) In the glass run channel assembly of (7) or (8), the upper side portion and the vertical side portion may be connected integrally in the corner portion, and an intersection angle in the corner portion in a state before being mounted along the door frame may change so as to become gradually small from an intersection angle same as that of the upper side portion to an intersection angle same as that of the vertical side portion as approaching from the upper side portion toward the vertical side portion.

In the glass run channel assembly of (9), integrity in the corner portion in the longitudinal direction, and in the vicinity thereof (that is, the end of the upper side portion near the corner portion, and the end of the vertical side portion near the corner portion) is excellent, and mounting operation to the door frame is easy. Additionally, unexpected deformation does not occur in the corner portion during mounting operation.

Therefore, according to the glass run channel assembly of (9), in addition to the effects that are exhibited by the glass run channel assembly of (7) or (8), the effect that the glass run channel assembly can be stably mounted to the whole frame including the corner portion (that is, the corner frame) of the door frame can be obtained.

(10) In the glass run channel assembly of any one of (1) to (9), the cross-sectional shapes may be adjusted such that a thickness of the exterior connection of the upper side portion is larger than the thickness of the exterior connection of the vertical side portion and/or a thickness of the interior connection of the upper side portion is larger than a thickness of the interior connection of the vertical side portion.

In the glass run channel assembly of (10), a larger elastic force than that in the vertical side portion can be generated in the upper side portion. For this reason, according to the glass run channel assembly of (10), a high frictional force can be generated between the upper side portion of the glass run channel assembly and the upper frame of the door frame including the inclination frame, and occurrence of an unexpected positional deviation of the glass run channel assembly accompanying the operation of the windowpane which moves up and down can be prevented in advance.

(11) In the glass run channel assembly of (10), the thickness of the exterior connection of the upper side portion may be larger than the thickness of the exterior connection of the vertical side portion and the thickness of the interior connection of the upper side portion may be larger than the thickness of the interior connection of the vertical side portion.

In the glass run channel assembly of (11), much larger elastic force than that in the vertical side portion can be generated in the upper side portion. For this reason, according to the glass run channel assembly of (11), much higher frictional force than that of the glass run channel assembly of (10) can be generated between the upper side portion of the glass run channel assembly and the upper frame of the door frame including the inclination frame, and occurrence of an unexpected positional deviation of the glass run channel assembly accompanying the operation of the windowpane which moves up and down can be prevented more reliably.

(12) In the glass run channel assembly of any one of (1) to (11), a concealing lip may be integrally formed at each of the protruding tips of the exterior side wall portion and interior side wall portion of the upper side portion and vertical side portion, the concealing lip extending toward a side opposite to the seal lips in a folded-back shape while holding a space to the side wall portions, covers an inner peripheral edge of the door frame from the outside, and is able to be elastically deformed to grip the inner peripheral edge with the side wall portion when being mounted to the door frame, and when being mounted to the door frame, the exterior side wall portion and the interior side wall portion may be drawn to an exterior inner peripheral edge and an interior inner peripheral edge of the door frame by the elastic force generated by the elastic deformation of the concealing lips, respectively.

In the glass run channel assembly of (12), much larger elastic force (in other words, pressing force) can be generated in addition to the elastic forces of the exterior side wall portion and interior side wall portion. Accordingly, according to the glass run channel assembly of (12), much high frictional force can be generated between the upper side portion of the glass run channel assembly and the upper frame of the door frame including the inclination frame, and occurrence of an unexpected positional deviation of the glass run channel assembly accompanying the operation of the windowpane which moves up and down can be prevented more reliably.

(13) In the glass run channel assembly of any one of (1) to (12), a low friction material layer whose static friction coefficient is lower than that of the bottom wall may be continuously formed on a portion of the bottom wall of the upper side portion which faces the outer peripheral end face of the windowpane, and low friction material layers whose static friction coefficients are lower than those of the bottom wall, the interior seal lip, and the exterior seal lip may be continuously formed in the longitudinal direction on a portion of the bottom wall of the vertical side portion which faces the outer peripheral end face of the windowpane, and on surfaces of the interior seal lip and the exterior seal lip of the vertical side portion.

According to the glass run channel assembly of (13), the frictional forces generated between the windowpane and the bottom wall of the upper side portion and between the bottom wall of the vertical side portion and the exterior and interior seal lips along with a moving up and down operation of the windowpane can be reduced. Therefore, according to the glass run channel assembly of (13), in addition to the effects that are exhibited by the glass run channel assembly of any one of (1) to (12), the effect of realizing more smooth moving up and down operation of the windowpane is obtained.

(14) The long glass run channel assembly is made of an elastic polymeric material, and is capable of being continuously mounted along an inside of a groove of a door frame, the groove being formed between an interior side wall and an exterior side wall arranged substantially parallel to each other in a width direction of a car, the door frame comprising a vertical frame which is arranged in a vertical direction along a center pillar of the car, an upper frame which includes an inclination frame extending obliquely downward along a front pillar or a rear pillar, and a corner frame which integrally connects an upper end of the vertical frame and an end of the upper frame at a side of the center pillar while being made to intersect each other at a predetermined intersection angle, and being configured to guide a windowpane which moves up and down within a door when mounted to the inside of the groove. The glass run channel assembly comprises: a long upper side portion made of a vulcanized elastic rubber and mounted along the upper frame of the door frame; a long vertical side portion made of an olefin system thermoplastic elastomer and mounted along the vertical frame of the door frame; and a corner portion made of a thermoplastic elastomer and mounted along the corner frame of the door frame. Each of the upper side portion, the vertical side portion and the corner portion comprises: a bottom wall; an interior side wall portion protruding from an interior end of the bottom wall in a direction intersecting the bottom wall by a first angle; and an exterior side wall portion protruding from an exterior end of the bottom wall in a direction intersecting the bottom wall by a second angle. The side wall portions of the upper side portion are continuously connected to the side wall portions of the vertical side portion via the side wall portions of the corner portion, respectively. A sum of the first angle and the second angle in the upper side portion is larger than a sum of the first angle and the second angle in the vertical side portion, and a sum of the first angle and the second angle in the corner portion varies gradually.

(15) In the glass run channel assembly of (14), thicknesses of the interior end and the exterior end of the bottom wall in the upper side portion may be larger than any thicknesses of the interior end and the exterior end of the bottom wall in the vertical side portion.

DETAILED DESCRIPTION

Hereinafter, embodiments of the present invention will be described. In addition, matters (for examples, general matters about manufacture of a glass run channel by extrusion molding or the like), other than matters particularly mentioned in this specification, which are required for carrying out the invention, would be understood by design matters for those skilled in the art based on the prior art. The invention can be carried out on the basis of the matters disclosed in the specification and drawings, and the technical common sense in the field.

First Embodiment

Figure 1:
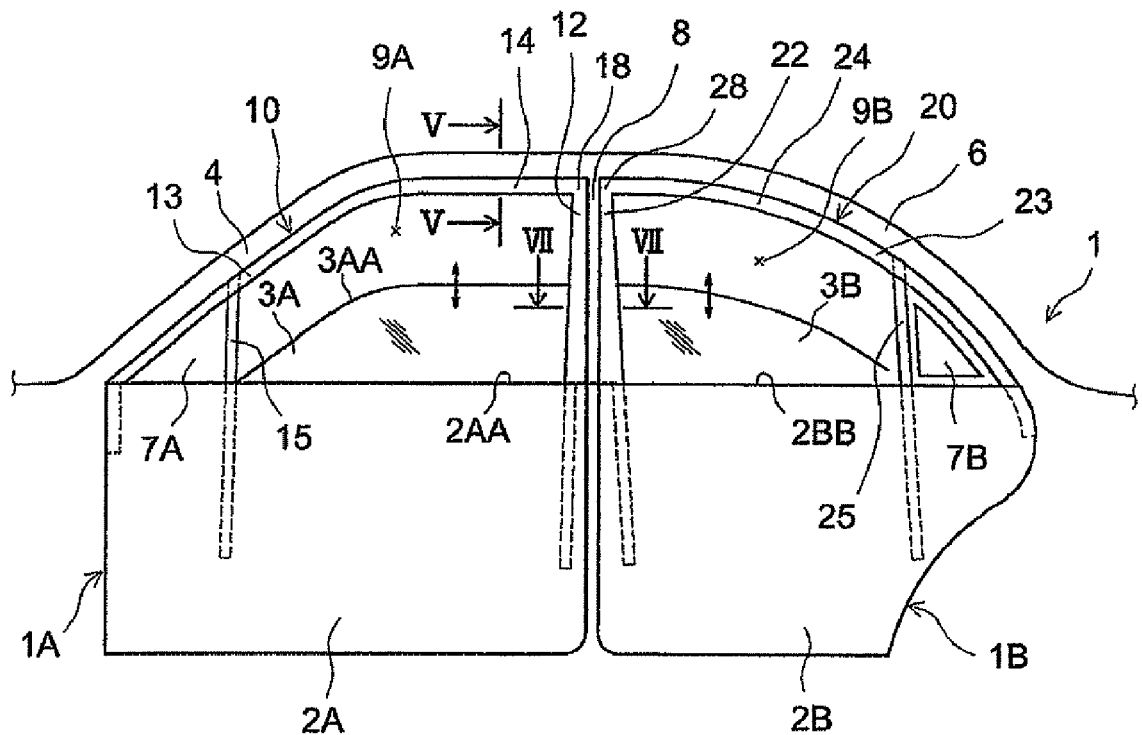
FIG. 1 is an exterior side view schematically showing front and rear doors of a car to which a glass run channel assembly according to a first embodiment of the invention is attached.

Hereinafter, a first embodiment of a glass run channel assembly of the invention will be described in detail with reference to the drawings. FIG. 1 is a side view schematically showing a front door 1A and a rear door 1B to be mounted to a car 1 (hereinafter referred to a sedan type passenger car). Although only the doors 1A and 1B to be mounted to the left side face of the car 1 is shown in this drawing, the door and glass run channel assembly of the same configuration (that is, bilaterally symmetrical) are also mounted as the right side face of the vehicle. For this reason, the following description is description about only glass run channel assemblies to be mounted to the left front and rear doors 1A and 1B which are shown, and description about glass run channel assemblies to be mounted to right door panels is omitted.

As shown in FIG. 1, the front door 1A related to the first embodiment is generally comprised of a door outer panel 2A and a door inner panel (not shown) (hereinafter, both are generically abbreviated to "door panel 2A") which constitute a door body, and a door frame (front door frame) 10 formed above the panel 2A. The front door frame 10 related to the first embodiment is a made of a sash (that is, a long material which is formed by bending a steel strip in a predetermined cross-sectional shape by a cold roll forming method).

The front door frame 10 has a vertical frame 12 arranged in a vertical direction along a center pillar 8 of the car 1, and an upper frame 14 which is formed integrally with an upper end of the vertical frame 12 and includes a portion of an inclination frame 13 which extends obliquely downward along a front pillar 4 from an upper end region of the vertical frame. The upper end of the vertical frame 12 and the terminal of the upper frame 14 on the side of the center pillar 8 are connected to each other by welding means, such as Tungsten-Inert Gas (TIG) welding, so as to intersect each other at a predetermined intersection angle. As shown in the drawing, this forms a corner portion, i.e., a corner frame 18 in which the upper end of the vertical frame 12 and the terminal of the upper frame 14 on the side of the center pillar 8 are connected integrally so as to intersect each other at a predetermined intersection angle. Additionally, a partition frame 15 having a groove which extends in a vertical direction (that is, a direction substantially orthogonal to a direction in which an upper periphery 2AA of the door panel 2A extends) is detachably mounted from the region of the inclination frame 13 of the upper frame 14 which is slightly nearer to the front. Although not particularly limited, in the first embodiment, the partition frame 15 is fastened and fixed to the upper frame 14 (specifically, the inclination frame 13) by screws or the like via an L-shaped joint fitting (not shown).

Thus, a glass run channel assembly 50 related to the first embodiment is mounted within an inside groove of the front door frame 10 (that is, the vertical frame 12, the upper frame 14 including the inclination frame 13, the partition frame 15, and the corner frame 18). The character and state of the glass run channel assembly will be described below.

A triangular opening, which is surrounded by the door panel upper periphery 2AA, the upper frame 14 (specifically, the inclination frame 13), and the partition frame 15, is formed in front side of the partition frame 15, and a front quarter window glass (that is, fixed window) 7A is fitted into the opening.

A substantially rectangular window opening 9A, which is surrounded by the door panel upper periphery 2AA, the upper frame 14 (including the inclination frame 13), the vertical frame 12, and the partition frame 15, is formed in the rear side of the partition frame 15. A windowpane 3A, which is mounted to a windowpane lifting mechanism (not shown) provided within the door panel 2A, is mounted to the window opening 9A in a vertically movable manner while being guided by the glass run channel assembly 50 which will be described later.

Similarly, the rear door 1B related to the first embodiment is generally comprised of a door outer panel 2B and a door inner panel (not shown) (hereinafter, both are generically abbreviated to "door panel 2B") which constitute a door body, and a door frame (rear door frame) 20 formed above the panel 2B. The rear door frame 20 related to the first embodiment is made of the same sash as the front door frame 10.

The rear door frame 20 has a vertical frame 22 arranged in a vertical direction along the center pillar 8 of the car 1, and an upper frame 24 which is formed integrally with an upper end of the vertical frame 22 and includes the portion of an inclination frame 23 which extends obliquely downward along a rear pillar 6 from an upper end region of the vertical frame 22. The upper end of the vertical frame 22 and the terminal of the upper frame 24 on the side of the center pillar 8 are connected to each other by welding means, such as TIG welding, so as to intersect each other at a predetermined intersection angle. As shown in the drawing, this forms a corner portion, i.e., a corner frame 28 in which the upper end of the vertical frame 22 and the terminal of the upper frame 24 on the side of the center pillar 8 are connected integrally so as to intersect each other at a predetermined intersection angle. Additionally, a partition frame 25 having a groove which extends in a vertical direction (that is, a direction substantially orthogonal to a direction in which an upper periphery 2BB of the door panel 2B extends) is detachably mounted from the region of the inclination frame 23 of the upper frame 24 which is slightly nearer to the rear.

Thus, a glass run channel assembly 150 related to the first embodiment similar to the front door frame 10 is mounted within an inside groove of the rear door frame 20 (that is, the vertical frame 22, the upper frame 24 including the inclination frame 23, the partition frame 25, and the corner frame 28). The character and state of the glass run channel assembly will be described below.

A triangular opening, which is surrounded by the door panel upper periphery 2BB, the upper frame 24 (specifically, the inclination frame 23), and the partition frame 25, is formed in the rear side of the partition frame 25, and a rear quarter window glass (that is, fixed window) 7B is fitted into the opening.

A substantially rectangular window opening 9B, which is surrounded by the door panel upper periphery 2BB, the upper frame 24 (including the inclination frame 23), the vertical frame 22, and the partition frame 25, is formed in front of the partition frame 25. A windowpane 3B, which is mounted to a windowpane lifting mechanism (not shown) provided within the door panel 2B, is mounted to the window opening 9B in a vertically movable manner while being guided by the glass run channel assembly 150 which will be described later.

Figure 2:
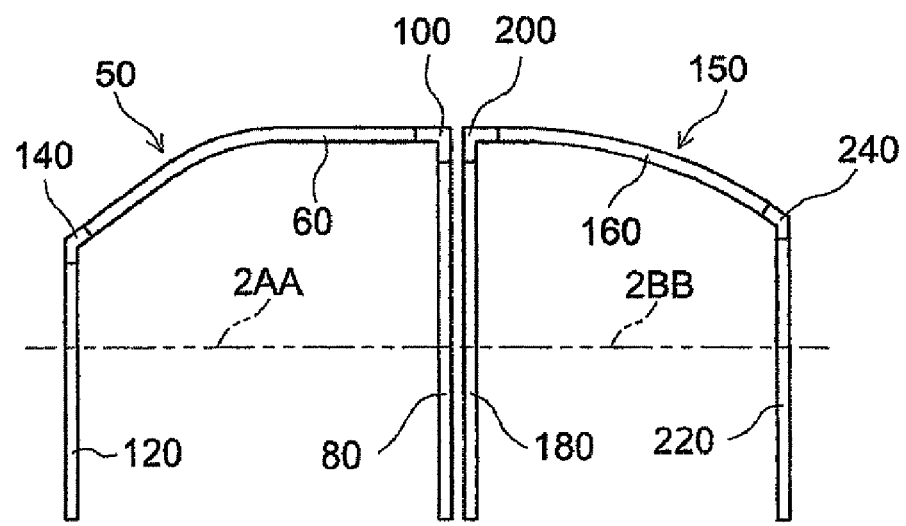
FIG. 2 is a side view schematically showing the entire structure of the glass run channel assembly according to the first embodiment.

FIG. 2 is a side view schematically showing the whole glass run channel assembly 50 or 150 related to the first embodiment, which is mounted within the groove of the front door frame 10 or the rear door frame 20, which is described above. As shown in this drawing, the glass run channel assembly 50 or 150 related to the first embodiment includes a long upper side portion 60 or 160, a long vertical side portion 80 or 180, an upper corner portion 100 or 200, a long partition side portion 120 and 220, and a lower corner portion 140 or 240.

As shown in this drawing, there is a slight difference in size or the like depending on a difference in the shape of the door frames 10 and 20. However, the glass run channel assembly 50 for the front door frame 10 and the glass run channel assembly 150 for the rear door frame 20 are almost the same in their general configuration, and there is no difference in the configuration which characterizes the invention. Accordingly, the following description will be given about the glass run channel assembly 50 for the front door frame 10, and since the description about the glass run channel assembly 150 for the rear door frame 20 is redundant, it is omitted.

The long upper side portion 60, which is mounted along the upper frame 14 of the front door frame 10, is a long molded portion which is formed by extrusion-molding an elastic polymeric material. Typically, the upper side portion is formed from vulcanized elastic rubber (typically, a material composed mainly of ethylene propylene diene rubber (EPDM rubber)) such that the coefficient of static friction with the front door frame 10 becomes a predetermined value ($\mu 1$). For example, the upper side portion is obtained by performing extrusion molding, using a rubber material for extrusion molding obtained by blending EPDM (here, 100 parts by mass), carbon black (here, 120 parts by mass), process oil (here, 80 parts by mass), various kinds of vulcanizing agents (here, 1 part by mass of sulfur), various kinds of fillers (here, 30 parts by mass of talc), various kinds of vulcanization accelerators (here, 2 parts by mass), and the like, and performing heat-treating (for example, about 200° C.) to vulcanize the extrudate.

Although not particularly limited, when this kind of material is used, a molded body whose static friction coefficient ($\mu 1$) is about equal to or more than 1.1 and less than 1.7 (typically 1.4±0.1) can be formed.

Meanwhile, the vertical side portion 80 and the partition side portion 120, which are respectively mounted along the vertical frame 12 and the partition frame 15 of the front door frame 10 are long molded portion which are formed by extrusion-molding an elastic polymeric material. Typically, the vertical side portion and the partition side portion are formed from an olefin system thermoplastic elastomer (TPO) such that the coefficient of static friction with the front door frame 10 becomes a value ($\mu 2$) larger than the above static friction coefficient $\mu 1$ in the upper side portion 60. For example, the vertical side portion and the partition side portion are preferably obtained using various TPO products (for instance, TPO materials sold by AES Japan, Inc. (for example, trade name: Santoprene (registered trademark) 121-67W)) which are commercially available.

Although not particularly limited, when this kind of material is used, a molded body whose static friction coefficient ($\mu 2$) is about equal to or more than 1.7 and less than 2.0 (typically 1.8±0.1) can be formed.

Additionally, the upper corner portion 100, which is mounted along the corner frame 18 of the front door frame 10 and integrally connects the upper side portion 60 and the vertical side portion 80, and the lower corner portion 140, which connects the upper side portion 60 and the partition side portion 120, are molded portions formed by injection-molding an elastic polymeric material. Typically, the molding and connection of the corner portions can be simultaneously performed by placing the corner portion within an injection molding mold while the terminals (specifically, the terminal of the upper side portion 60 and the terminal of the vertical side portion 80, or the terminal of the upper side portion 60 and the terminal of the partition side portion 120) of long moldings to be connected are made to intersect each other a predetermined intersection angle at a predetermined distance (space) from each other, and injecting a heated and melted thermoplastic elastomer material (for example, TPO) into a space within the injection molding mold. Otherwise, the corner portion 100 or 140 which has been molded in a predetermined shape in advance may be prepared, and the corner portion may be connected to the terminals (specifically, the terminal of the upper side portion 60 and the terminal of the vertical side portion 80 or the terminal of the upper side portion 60 and the terminal of the partition side portion 120) of long moldings to be connected by a suitable adhesive.

Next, the configuration of the upper side portion 60 and the vertical side portion 80 which characterize the glass run channel assembly 50 related to the first embodiment will be described in detail.

Figure 3:
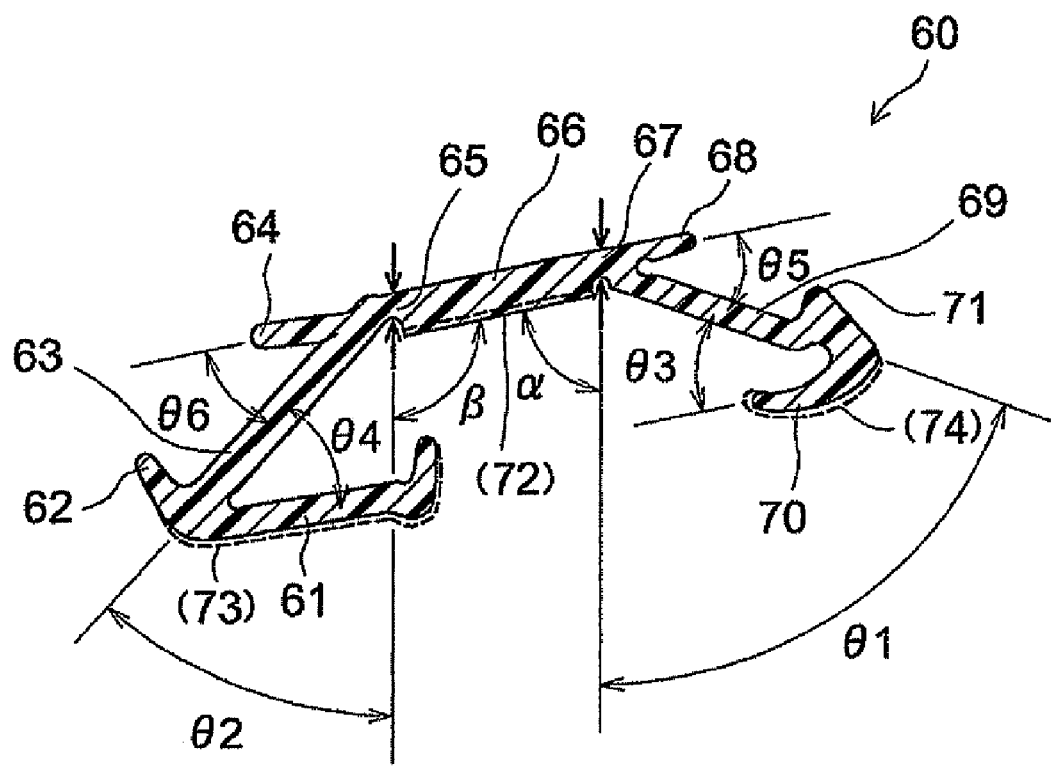
FIG. 3 is a sectional view showing a cross-sectional shape of an upper side portion after extrusion molding of the glass run channel assembly according to the first embodiment.
Figure 4:
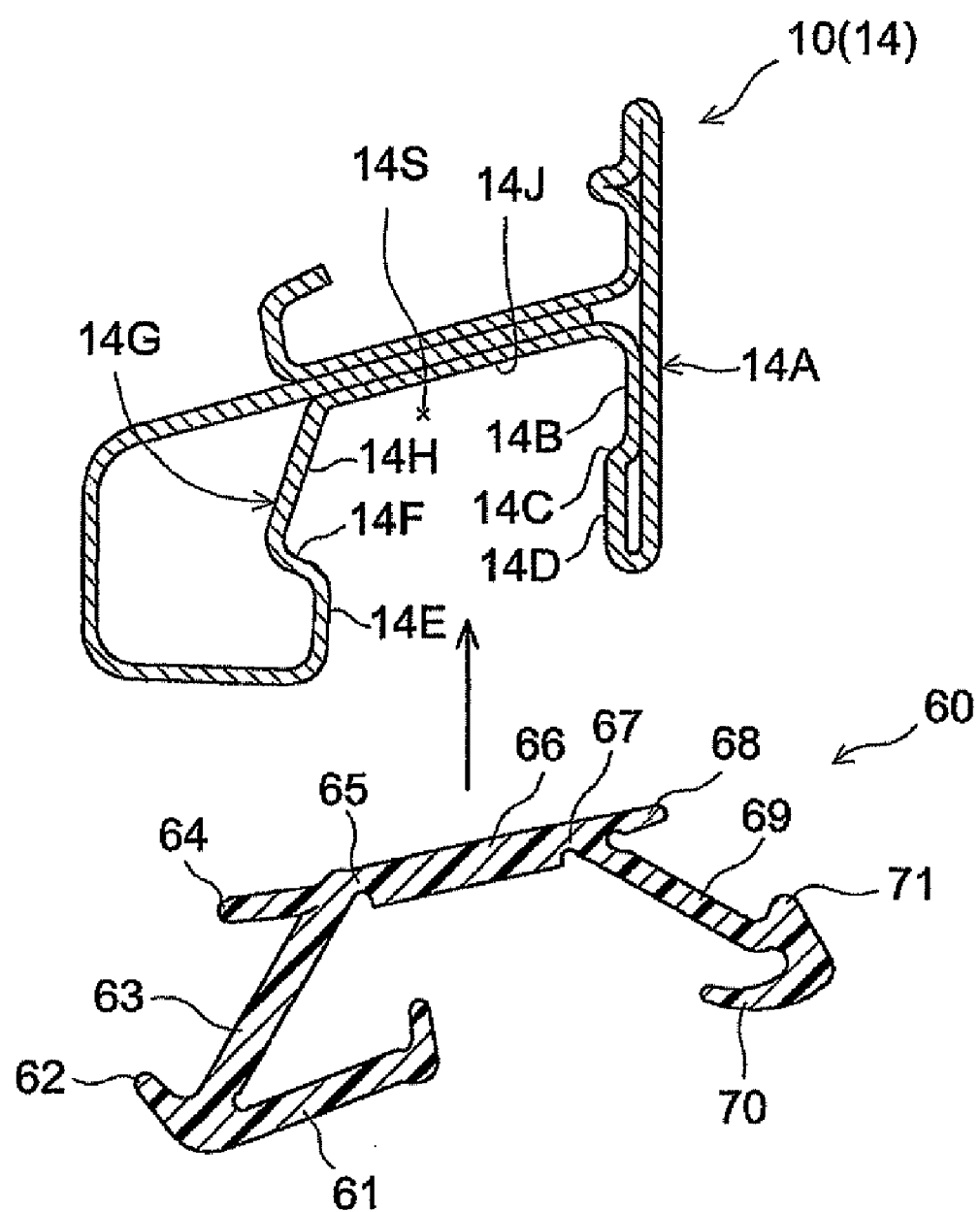
FIG. 4 is a sectional view showing a cross-sectional shape of an upper side portion after extrusion molding of the glass run channel assembly according to the first embodiment, and a mounting direction of the upper side portion to an upper frame.

First, the configuration of the upper side portion 60, and the structure of the upper frame 14 to which the upper side portion 60 is mounted will be described referring to the drawings. The cross-sectional shape of the upper side portion 60 after extrusion molding (that is, before being mounted to the door frame 10) is shown in FIGS. 3 and 4. Also, the cross-sectional shape of the upper frame 14 which is a portion of the front door frame 10 is shown in FIG. 4. Additionally, FIG. 5 is a sectional view taken along line V-V of FIG. 1 showing a state where the upper side portion 60 is mounted to the upper frame 14.

First, the structure of the upper frame 14 (the same is true on the upper frame 24 of the above rear door frame 20) of the front door frame 10 will be described. As shown in FIG. 4, the upper frame 14 is formed from steel which is bent such that an interior side wall 14G and an exterior side wall 14A are arranged substantially parallel to each other in the width direction of the car, and a groove 14S is formed between the two side walls 14A and 14G along the frame. Specifically, the periphery of the groove 14S within the upper frame 14 is formed by the exterior side wall 14A, the interior side wall 14G, and a bottom wall 14J. As shown in FIG. 5, in the first embodiment, the planar direction of the bottom wall 14J and the lifting direction of the windowpane 3A are not orthogonal to each other, but are inclined such that the exterior of the bottom wall 14J is at a higher position than the interior thereof (that is, such that the intersection angle between the lifting direction of the windowpane 3A and the exterior of the bottom wall 14J is an obtuse angle).

Additionally, the portion of the exterior side wall 14A near the bottom wall 14J is formed as an enlarged wall 14B which is recessed more than an inner peripheral wall 14D near an opening of the exterior side wall 14A such that the space (the distance between the exterior side wall 14A and the interior side wall 14G) within the groove is enlarged more than the vicinity of the opening, and a stepped portion 14C is formed between the enlarged wall 14B and the inner peripheral wall 14D. Similarly, the portion of the bottom wall 14J near the interior side wall 14G is formed as an enlarged wall 14H which is recessed more than an inner peripheral wall 14E near an opening of the interior side wall 14G, and a stepped portion 14F is formed between the enlarged wall 14H and the inner peripheral wall 14E.

Figure 5:
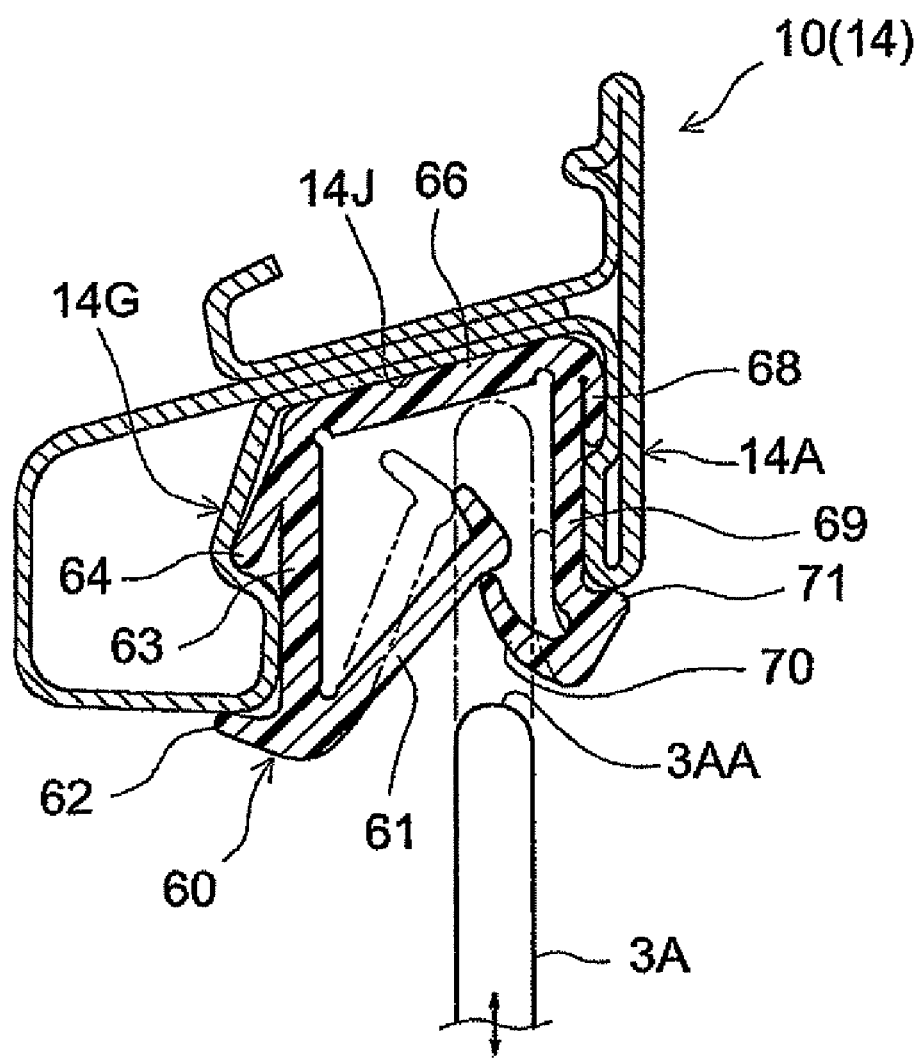
FIG. 5 is a cross-sectional view taken along line V-V in FIG. 1.

As shown in FIGS. 3 to 5, the upper side portion 60 of the glass run channel assembly 50 related to the first embodiment generally has a bottom wall portion 66 arranged in a position which faces an outer peripheral end face 3AA of the windowpane 3A, an interior side wall portion 63 which protrudes via an interior connection 65 from an interior end in a width direction of the bottom wall portion 66, and an exterior side wall portion 69 which protrudes via an exterior connection 67 from an exterior end in the width direction of the bottom wall portion 66. As shown in FIGS. 3 to 5, the interior connection 65 and the exterior connection 67 are formed so as to have a smaller thickness than the adjacent bottom wall portion 66 or both the interior and exterior side wall portions 63 and 69 such that they can be bent when being mounted to the door frame 10 (refer to opposed arrows in FIG. 3).

As shown in FIG. 3, in a state before the glass run channel assembly is mounted to the door frame 10, an extrusion-molded body which constitutes the upper side portion 60 has an expanded, substantially U-shaped constant cross-sectional shape by the bottom wall portion 66 and both the interior and exterior side wall portions 63 and 69. Moreover, as shown in this drawing, an interior seal lip 61 and an exterior seal lip 70 which extend in a folded-back shape toward the bottom wall portion 66 integrally from protruding tips of the interior side wall portion 63 and the exterior side wall portion 69 while holding a space to the side wall portions 63 and 69 are provided.

Moreover, as shown in this drawing, an interior engagement projection ridge 64 is formed at the end of the interior side wall portion 63 near the bottom wall portion 66 so as to project outward. Moreover, an interior tip projection 62 is formed at the end of the interior side wall portion 63 near the interior seal lip 61 so as to project outward. Similarly, an exterior engagement projection ridge 68 is formed at the end of the exterior side wall portion 69 near the bottom wall portion 66 so as to project outward. Moreover, an exterior tip projection 71 is formed at the end of the exterior side wall portion 69 near the exterior seal lip 70 so as to project outward.

The upper side portion 60 of the glass run channel assembly 50 related to the first embodiment is extrusion-molded such that the relative positional relationship, i.e., angle, of the aforementioned respective portions is adjusted as indicated by $\theta$ in FIG. 3. Specifically, the cross-sectional shape after extrusion molding is adjusted such that an angle $\theta 3$ between the exterior side wall portion 69 and the exterior seal lip 70 is about 40°, an angle $\theta 4$ between the interior side wall portion 63 and the interior seal lip 61 is about 40°, an angle $\theta 5$ between the exterior side wall portion 69 and the exterior engagement projection ridge 68 is about 35°, and the angle $\theta 6$ between the interior side wall portion 63 and the interior engagement projection ridge 64 is about 35°.

Additionally, as is clear from the comparison between FIGS. 3, and 4 and FIG. 5, with respect to the cross-sectional shape of the upper side portion 60, each of the interior side wall portion 63 and the exterior side wall portion 69 is changed to a U-shape (here, a U-shape in which the angle $\alpha$ between the bottom wall portion 66 and the exterior side wall portion 69 after mounting to the upper frame 14 is about 80°, and the angle $\beta$ between the bottom wall portion 66 and the interior side wall portion 63 is about 100°) after being mounted (refer to FIG. 5) in which the expansion degree of the expanded U-shape before the mounting is reduced with the bent elastic deformation of the connections 65 and 67 along the upper frame 14 of the front door frame 10 from the expanded substantial U-shape (refer to FIGS. 3 and 4) after extrusion molding. In the first embodiment, such elastic deformation angles are adjusted such that a predetermined elastic force (f1) is obtained in portions where the interior side wall portion 63 and the exterior side wall portion 69 contact the upper frame after mounting to the door frame 10 (the upper frame 14). Here, the elastic deformation angle θ1 of the exterior side wall portion 69 is set to about 65°, and the elastic deformation angle θ2 of the interior side wall portion 63 is set to about 45°. That is, as is clear from the angles indicated by the above α and β and the angles indicated by the above θ1 and θ2, in the first embodiment, the glass run channel assembly is formed such that both the intersection angle (α+θ1=145°) between the bottom wall portion 66 of the upper side portion 60 and the exterior side wall portion 69 and the intersection angle (β+θ2=145°) between the bottom wall portion 66 of the upper side portion 60 and the interior side wall portion 63 are an obtuse angle in a state before the glass run channel assembly is mounted to the door frame 10 (refer to FIGS. 3 and 4).

Additionally, in the first embodiment, the thickness of the exterior connection 67 of the aforementioned upper side portion 60 is made larger than the thickness of the exterior connection 87 of the vertical side portion 80 which will be described later, and the thickness of the interior connection 65 of the upper side portion 60 is also made larger than the thickness of the interior connection 85 of the vertical side portion 80.

By adjusting and setting various conditions as described above, the cross-sectional shape of the upper side portion 60 related to the first embodiment is adjusted such that the frictional force per unit length obtained by multiplying the coefficient μ1 of static friction with the upper frame 14 by the elastic force f1 is relatively larger than the frictional force per unit length obtained by multiplying the coefficient μ2 of static friction of the vertical side portion 80 (the same is true on the partition side portion 120), which will be described later, with the vertical frame 12 by the elastic force f2.

Thus, the upper side portion 60 of the above configuration, as shown in FIG. 5, is mounted into the groove 14S upward from below the upper frame 14 while being elastically deformed from the expanded U-shape to the reduced U-shape as described above due to the elastic deformation that the interior and exterior connections 65 and 67 are curved in a bent shape. At this time, as shown in FIG. 5, the interior side wall portion 63 and the exterior side wall portion 69 which have been elastically deformed are pressed against the interior side wall 14G and the exterior side wall 14A, respectively, by the predetermined elastic force (f1). Here, the upper side portion 60 related to the first embodiment is formed from a vulcanized elastic rubber (typically, a material composed mainly of ethylene propylene diene rubber (EPDM rubber)) as described above. Thus, in this mounting part, the upper side portion is made of elastic rubber whose static friction coefficient is lower than that of a conventional glass run channel assembly which is molded from TPO. Therefore, the mounting operation to the door frame 10 becomes easy, and the load (fatigue) given to a mounting operator can be made small. Specifically, the operation, of mounting a glass run channel assembly upward from below the upper frame 14 is the operation which forces a burden upon an operator more than a case where the glass run channel assembly is mounted downward from above or laterally. However, since the upper side portion 60 is made of elastic rubber whose static friction coefficient is low, it becomes easy to mount the glass run channel assembly upward from below the upper frame 14.

Additionally, in this mounting part, the upper side portion 60 is made of the above elastic rubber with smaller creep deformation unlike the glass run channel which is molded from TPO in whole. Therefore, the frictional force generated between the upper side portion 60 and the upper frame 14 (including the inclination frame 13) can be kept larger than that of a glass run channel which is molded from TPO in whole after lapse of predetermined time after mounting. Accordingly, in this mounting part, occurrence of an unexpected positional deviation of the glass run channel assembly 50 accompanying the operation of the windowpane 3A which moves up and down can be prevented over a prolonged period of time. In addition, as shown in FIG. 3, it is preferable that a low friction material layer 72 whose static friction coefficient is lower than that of the bottom wall portion 66 be continuously formed in a longitudinal direction in the portion of the bottom wall portion 66 of the upper side portion 60 which faces the outer peripheral end face 3AA of the windowpane 3A.

In addition, it is preferable that a low friction material layer 73, 74 whose static friction coefficient is low be continuously formed in the longitudinal direction even in the outer surfaces of the interior and exterior seal lips which can contact the windowpane 3A shown in FIG. 5. As a material which constitutes this low friction material layer, for example, coating, such as urethane coating, can be included. In addition, the preferable range of the coating is shown by a broken line in FIG. 3.

Additionally, according to the upper side portion 60 related to the first embodiment, the interior engagement projection ridge 64 and the exterior engagement projection ridge 68 are fitted into the interior enlarged wall 14H and the exterior enlarged wall 14B, respectively, by elastic rebounding during mounting, and the stepped portions 14C and 14F become hindrances, so that slip-off of the upper side portion 60 can be prevented more reliably. Additionally, according to the upper side portion 60 related to the first embodiment, a gap created between the interior side wall 14G and exterior side wall 14A of the upper frame 14 and the upper side portion 60 can be concealed by the interior tip projection 62 and the exterior tip projection 71 after mounting.

First, the configuration of the vertical side portion 80, and the structure of the vertical frame 12 to which the vertical side portion 80 is mounted will be described referring to the drawings.

In addition, since the configuration of the partition side portion 120 and the structure of the partition frame 15 to which the partition side portion 120 is mounted are almost the same as the configuration of the vertical side portion 80, and the structure of the vertical frame 12 to which the vertical side portion 80 is mounted, the duplicate description thereof is omitted.

Figure 6:
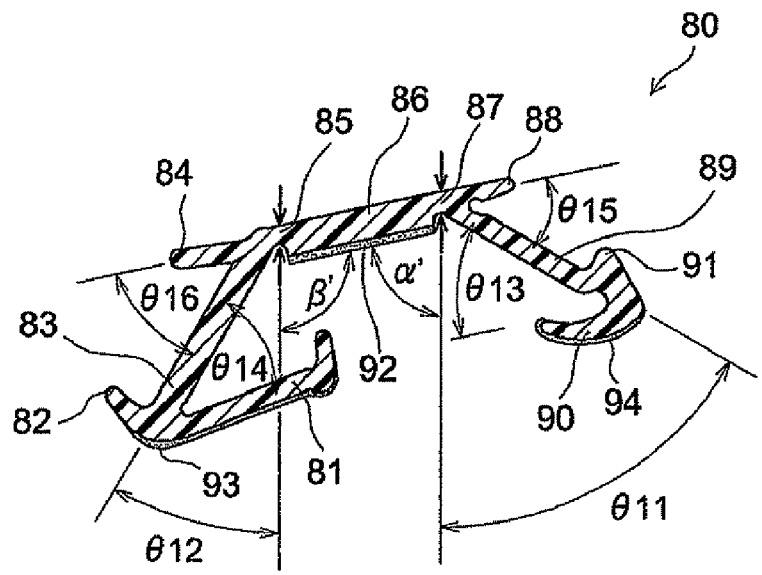
FIG. 6 is a sectional view showing a cross-sectional shape of a vertical side portion after extrusion molding of the glass run channel assembly according to the first embodiment.
Figure 7:
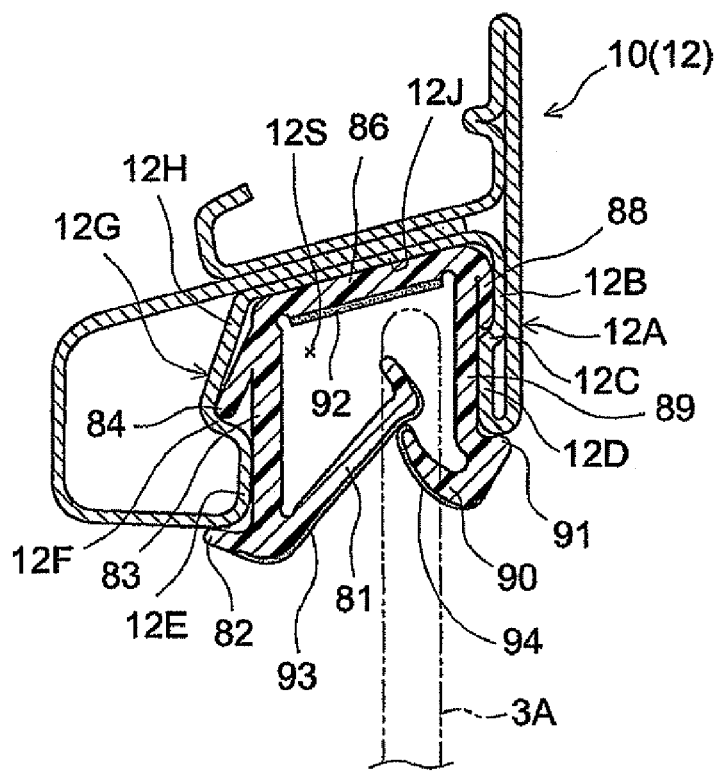
FIG. 7 is a cross-sectional view taken along line VII-VII in FIG. 1.

The cross-sectional shape of the vertical side portion 80 after extrusion molding (that is, before being mounted to the door frame 10) is shown in FIG. 6. Additionally, FIG. 7 is a sectional view taken along line VII-VII of FIG. 1 showing a state where the vertical side portion 80 is mounted to the vertical frame 12. In addition, illustration of the vertical frame 22 of the rear door 1B is omitted in FIG. 7.

As shown in FIG. 7, the vertical frame 12 has the same structure as the aforementioned upper frame 14, and is formed from steel strip which is bent such that the interior side wall 120 and the exterior side wall 12A are arranged substantially parallel to each other in the width direction of the car, and a groove 12S is formed between the two side walls 12A and 12G along the frame. That is, the periphery of the groove 12S within the vertical frame 12 is constituted by the exterior side wall 12A, the interior side wall 12G, and a bottom wall 12J. Similarly to the upper frame 14, the planar direction of the bottom wall 12J and the planar direction of the windowpane 3A are not orthogonal to each other, but are inclined such that the exterior of the bottom wall 12J is located nearer the rear of the vehicle than the interior thereof (that is, such that the intersection angle between the planar direction of the windowpane 3A and the exterior of the bottom wall 12J is an obtuse angle).

Additionally, the portion of the exterior side wall 12A near the bottom wall 12J is formed as an enlarged wall 12B which is recessed more than an inner peripheral wall 12D near an opening of the exterior side wall 12A such that the space (the distance between the exterior side wall 12A and the interior side wall 12G) within the groove is enlarged more than the vicinity of the opening, and a stepped portion 12C is formed between the enlarged wall 12B and the inner peripheral wall 12D. Similarly, the portion of the interior side wall 12G near the bottom wall 12J is formed as an enlarged wall 12H which is recessed more than an inner peripheral wall 12E near an opening of the interior side wall 12G, and a stepped portion 12F is formed between the enlarged wall 12H and the inner peripheral wall 12E.

As shown in FIGS. 6 and 7, the vertical side portion 80 of the glass run channel assembly 50 related to the first embodiment generally has a bottom wall portion 86 arranged in a position which faces an outer peripheral end face 3AA of the windowpane 3A, an interior side wall portion 83 which protrudes via an interior connection 85 from an interior end in a width direction of the bottom wall portion 86, and an exterior side wall portion 89 which protrudes via an exterior connection 87 from an exterior end in the width direction of the bottom wall portion 86. As shown in FIG. 7, the interior connection 85 and the exterior connection 87 are formed so as to have a smaller thickness than the adjacent bottom wall portion 86 or both the interior and exterior side wall portions 83 and 89 such that they can be bent when being mounted on the door frame 10 (refer to opposed arrows in FIG. 6).

As shown in FIG. 6, in a state before the glass run channel assembly is mounted to the door frame 10, an extrusion-molded body which constitutes the vertical side portion 80 has an expanded, substantially U-shaped constant cross-sectional shape by the bottom wall portion 86 and both the interior and exterior side wall portions 83 and 89. Moreover, as shown in this drawing, an interior seal lip 81 and an exterior seal lip 90 which extend in a folded-back shape toward the bottom wall portion 86 integrally from protruding tips of the interior side wall portion 83 and the exterior side wall portion 89 while holding a space to the side wall portions 83 and 89 are provided.

Moreover, as shown in this drawing, an interior engagement projection ridge 84 is formed at the end of the interior side wall portion 83 near the bottom wall portion 86 so as to project outward. Additionally, an interior tip projection 82 is formed at the end of the interior side wall portion 83 near the interior seal lip 81 so as to project outward. Similarly, an exterior engagement projection ridge 88 is formed at the end of the exterior side wall portion 89 near the bottom wall portion 86 so as to project outward. Moreover, an exterior tip projection 91 is formed at the end of the interior side wall portion 89 near the seal lip 90 so as to project outward.

Additionally, low friction material layers 92, 93, and 94 whose static friction coefficients are lower than those of the bottom wall portion 86, the interior seal lip 81, and the exterior seal lip 90 are continuously formed in a longitudinal direction in the portion of the bottom wall portion 86 of the vertical side portion 80 which faces the outer peripheral end face 3AA of the windowpane 3A, and in the outer surfaces of the interior seal lip 81 and the exterior seal lip 90. Although not particularly limited, as a material which constitutes the low friction material layers 92, 93, and 94, for example, compositions obtained by mixing polypropylene, ultrahigh molecular weight polyethylene, EPDM, silicone oil, etc. can be included.

The vertical side portion 80 of the glass run channel assembly 50 related to the first embodiment is extrusion-molded such that the relative positional relationship, i.e., angle, of the aforementioned respective portions is adjusted as indicated by θ in FIG. 6. Specifically, the cross-sectional shape after extrusion molding is adjusted such that an angle θ13 between the exterior side wall portion 89 and the exterior seal lip 90 is about 40°, an angle θ14 between the interior side wall portion 83 and the interior seal lip 81 is about 40°, an angle θ15 between the exterior side wall portion 89 and the exterior engagement projection ridge 88 is about 45°, and the angle θ16 between the interior side wall portion 83 and the interior engagement projection ridge 84 is about 50°.

Moreover, as is clear from the comparison between FIGS. 6 and 7, with respect to the cross-sectional shape of the vertical side portion 80, each of the interior side wall portion 83 and the exterior side wall portion 89 is changed to a U-shape (here, a U-shape in which the angle α' between the bottom wall portion 86 and the exterior side wall portion 89 after mounting to the vertical frame 12 is about 80°, and the angle β' between the bottom wall portion 86 and the interior side wall portion 83 is about 100°) in which the expansion degree of the expanded U-shape before the mounting is reduced with the bent elastic deformation of the connections 85 and 87 after being mounted (refer to FIG. 7) along the vertical frame 12 of the front door frame 10 from the expanded substantial U-shape (refer to FIG. 6) after extrusion molding. In the first embodiment, such elastic deformation angles are adjusted such that a predetermined elastic force (f2) is obtained in portions where the exterior side wall portion 89 and the interior side wall portion 83 contact the vertical frame after mounting to the door frame 10 (the vertical frame 12). Here, the elastic deformation angle θ11 of the exterior side wall portion 89 is set to about 55°, and the elastic deformation angle θ12 of the interior side wall portion 83 is set to about 30°.

As is clear from the specific examples of the elastic deformation angles θ11 and θ12, in the glass run channel assembly 50 related to the first embodiment, the respective elastic deformation angles θ2 and θ1 of the interior side wall portion 63 and the exterior side wall portion 69 in the upper side portion 60 are set so as to be larger than the elastic deformation angles θ12 and θ11 of the interior side wall portion 83 and the exterior side wall portion 89 in the vertical side portion 80. That is, the cross-sectional shapes of the upper side portion 60 and the vertical side portion 80 are adjusted so as to realize θ1>θ11 and θ2>θ12.

Herein, the cross-sectional shapes of the upper side portion 60 and the vertical side portion 80 may be adjusted such that a sum of the elastic deformation angles θ1+θ2 is larger than a sum of the elastic deformation angles θ11+θ12.

In the upper side portion 60 and the vertical side portion 80 related to the first embodiment, in addition to the relationship between the elastic deformation angles θ1, θ2, θ11, and θ12, the cross-sectional shapes of the upper side portion 60 and the vertical side portion 80 are adjusted such that the frictional force per unit length obtained by multiplying the coefficient μ2 of static friction of the vertical side portion 80 with the vertical frame 12 by the elastic force f2 is relatively smaller than the frictional force per unit length obtained by multiplying the coefficient μ1 of static friction of the aforementioned upper side portion 60 with the upper frame 14 by the elastic force f1.

Thus, the vertical side portion 80 of the above configuration, as shown in FIG. 7, is laterally mounted into the groove 12S of the vertical frame 12 while being elastically deformed from the expanded U-shape to the reduced U-shape as described above due to the elastic deformation that the interior and exterior connections 85 and 87 are curved in a bent shape. At this time, as shown in FIG. 7, the interior side wall portion 83 and the exterior side wall portion 89 which have been elastically deformed are pressed against the interior side wall 12G and the exterior side wall 12A, respectively, by the predetermined elastic force (f2). Here, since the vertical side portion 80 related to the first embodiment is formed from a TPO material whose specific gravity is smaller than rubber which constitutes the upper side portion 60, a reduction in weight can be achieved compared with a glass run channel assembly which is molded from rubber in whole. That is, in addition to the prevention of positional deviation of the glass run channel assembly 50 in the vertical frame 12, it is possible to enjoy merits (an improvement in efficiency of conveyance, a reduction in the weight of a vehicle, etc.) by virtue of the reduction in weight.

Additionally, according to the vertical side portion 80 related to the first embodiment, the interior engagement projection ridge 84 and the exterior engagement projection ridge 88 are fitted into the interior enlarged wall 12H and the exterior enlarged wall 12B, respectively, by elastic rebounding after mounting, and the stepped portions 12C and 12F become hooks, so that slip-off of the vertical side portion 80 can be prevented more reliably. Additionally, according to the vertical side portion 80 related to the first embodiment, a gap created between the interior side wall 12G and exterior side wall 12A of the vertical frame 12 and the vertical side portion 80 can be concealed by the interior tip projection 82 and the exterior tip projection 91 after mounting.

Figure 8:
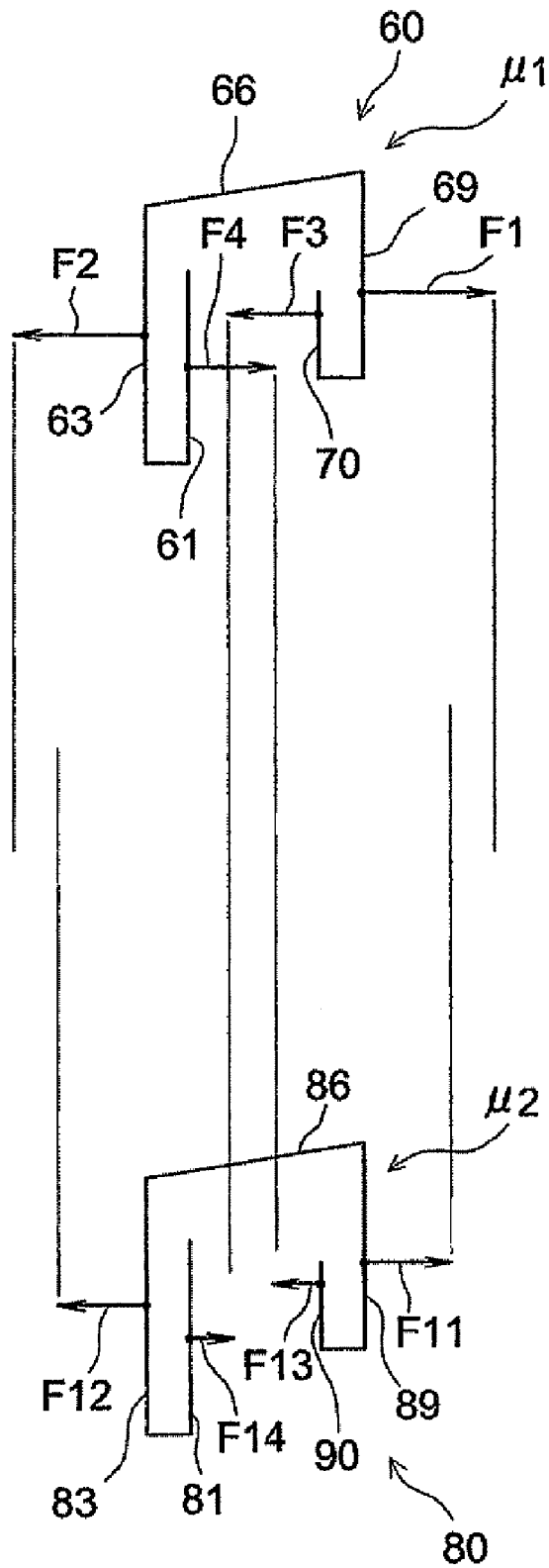
FIG. 8 is an explanatory view schematically showing an elastic force generated in each part of the glass run channel assembly according to the first embodiment after being mounted to a door frame.

As described above, in the glass run channel assembly 50 related to the first embodiment, the upper side portion 60 and the vertical side portion 80 (and the partition side portion 120) are formed from materials which are different from each other, and when being mounted along the door frame 10 as described above, both the upper side portion 60 and the vertical side portion 80 are arranged so as to be changed to a shape in which the expansion degree of the above expanded U-shape before mounting in the interior side wall portion 63 or 83 and the exterior side wall portion 69 or 89 is reduced by the elastic deformation of the connections 65, 67, 85, and 87 which are elastically deformed in a bent shape during mounting to the door frame. Also, after mounting to the door frame 10, the cross-sectional shapes of the upper side portion and the vertical side portion are adjusted such that a predetermined elastic force f2 is generated in portions where the interior side wall portion 83 and the exterior side wall portion 89 of the vertical side portion 80 contact the vertical frame 12, and a predetermined elastic force f1 is generated in portions where the interior side wall portion 63 and the exterior side wall portion 69 of the upper side portion 60 contacts the upper frame 14. Moreover, the cross-sectional shape of each of the upper side portion and the vertical side portion is adjusted such that the friction force per unit length obtained by multiplying the coefficient μ1 of static friction of the upper side portion 60 with the upper frame 14 by the elastic force f1 is larger than the frictional force per unit length obtained by multiplying the coefficient μ2 of static friction of the vertical side portion 80 with the vertical frame 12 by the elastic force f2. This relationship is typically shown in FIG. 8. Arrows to which symbols including the capital F in the drawings are given schematically represent the magnitude and direction of elastic forces in respective parts generated after mounting to the door frame vectorially. It is easily understood by the comparison between the magnitudes of vectors (arrow) from this drawing that the elastic force f1 (equivalent to F1 and F2 in FIG. 8) of the portion (specifically, the exterior side wall portion 69 and the interior side wall portion 63) of the upper side portion 60 which contacts the upper frame 14 is larger than the elastic force f2 (equivalent to F11 and F12 in FIG. 8) of the portion (specifically, the exterior side wall portion 89 and the interior side wall portion 83) of the vertical side portion 80 which contacts the vertical frame 12 (that is, F1>F11, F2>F12). In addition, F3 and F4 in the drawing respectively represent elastic forces generated in the exterior seal lip 70 and interior seal lip 61 of the upper side portion 60, and F13 and F14 in the drawing respectively represent elastic forces generated in the exterior seal lip 90 and interior seal lip 81 of the vertical side portion 80.

By adopting such a configuration, it is possible to provide the glass run channel assembly 50 which can realize both achievement of a reduction in weight compared with a glass run channel which is extrusion-molded in whole by using an extrusion molding material including a rubber material, and prevention of occurrence of positional deviation in the longitudinal direction of the door frame after being mounted to a given position of the door frame.

Additionally, as described above, in the glass run channel assembly 50 related to the first embodiment, at least one of the elastic deformation angles of the interior side wall portion 63 and the exterior side wall portion 69 in the upper side portion 60 is set so as to be larger than the elastic deformation angles of the interior side wall portion 83 and the exterior side wall portion 89 in the corresponding vertical side portion 80 (here, both θ1>θ11 and θ2>θ12). For this reason, a high frictional force can be generated between the upper side portion 60 and the upper frame 14 including the above inclination frame 13, and occurrence of an unexpected positional deviation of the glass run channel assembly 50 accompanying the operation of the windowpane 3A which moves up and down can be prevented.

Additionally, as described above, the glass run channel assembly 50 related to the first embodiment is molded such that at least one intersection angle (both intersection angles in the first embodiment) of the intersection angle between the bottom wall portion 66 of the upper side portion 60, and the exterior side wall portion 69, and the intersection angle between the bottom wall portion 66 of the upper side portion 60, and the interior side wall portion 63 is an obtuse angle in a state before being mounted to the door frame 10. For this reason, a high frictional force can be generated between the upper side portion 60 and the upper frame 14 including the above inclination frame 13, and occurrence of an unexpected positional deviation of the glass run channel assembly 50 accompanying the operation of the windowpane 3A which moves up and down can be prevented.

Additionally, as described above, the glass run channel assembly 50 related to the first embodiment is formed such that the thickness of the exterior connection 67 of the upper side portion 60 is larger than the thickness of the exterior connection 87 of the vertical side portion 80 and/or the thickness of the interior connection 65 of the upper side portion 60 is larger than the thickness of the interior connection 85 of the vertical side portion 80 (both thicknesses are larger in the first embodiment). For this reason, a larger elastic force than that in the vertical side portion 80 can be generated in the upper side portion 60, a high frictional force can be generated between the upper side portion 60 and the upper frame 14 including the above inclination frame 13, and occurrence of an unexpected positional deviation of the glass run channel assembly 50 accompanying the operation of the windowpane 3A which moves up and down can be prevented.

In addition, although not shown, in the glass run channel assembly 50 related to the first embodiment, the upper side portion 60 and the vertical side portion 80, and the upper side portion 60 and the partition side portion 120 are connected integrally in the corner portions 100 and 140, respectively, in order to maintain integrity in its longitudinal direction. Also, in a state before being mounted along the door frame 10, the upper corner portion 100 is formed such that the intersection angle between the bottom wall portion and the exterior side wall portion and the intersection angle between the bottom wall portion and the interior side wall portion in the upper corner portion 100 change so as to become gradually small from the same intersection angle as the upper side portion 60 to the same intersection angle as the intersection angle of the vertical side portion 80 as it approaches from the upper side portion 60 toward the vertical side portion 80. Similarly, the lower corner portion 140 is also formed such that the intersection angles change so as to become gradually small from the same intersection angle as the upper side portion 60 to the same intersection angle as the intersection angle of the partition side portion 120 as it approaches from the upper side portion 60 toward the partition side portion 120.

In addition, although not shown, in the glass run channel assembly 50 related to the first embodiment, the upper side portion 60 and the vertical side portion 80, and the upper side portion 60 and the partition side portion 120 are connected integrally in the corner portions 100 and 140, respectively, in order to maintain integrity in its longitudinal direction. Also, the upper corner portion 100 is formed such that the elastic deformation angles of the interior side wall portion and the exterior side wall portion in the upper corner portion 100 when being mounted along the door frame 10 change so as to become gradually small from the same elastic deformation angle as the upper side portion 60 to the same elastic deformation angle as the elastic deformation angle of the vertical side portion 80 as it approaches from the upper side portion 60 toward the vertical side portion 80. Similarly, the lower corner portion 140 is also formed such that the elastic deformation angles change so as to become gradually small from the same elastic deformation angle as the upper side portion 60 to the same elastic deformation angle as the elastic deformation of the partition side portion 120 as it approaches from the upper side portion 60 toward the partition side portion 120.

By forming the upper corner portion 100 and the lower corner portion 140 in this way, it is possible to provide a glass run channel assembly having excellent integrity in the corner portions 100 and 140 in the longitudinal direction, and in the vicinity thereof (that is, the end of an adjacent extrusion-molded portion near the corner portion), and easy mounting operation to the door frame 10. Additionally, unexpected deformation does not occur in the corner portion during mounting operation. Accordingly, it is possible to stably mount the glass run channel assembly 50 to the whole frame including the corner portion (that is, the corner frame 18 and the partition frame 15) of the door frame 10.

Second Embodiment

Hereinafter, a second embodiment of a glass run channel assembly of the invention will be described in detail with reference to the drawings. In a second embodiment, only the structure and operational effects of the upper side portion and vertical side portion which become characterizing portions of the second embodiment will be described, and the description about the corner portion or the partition side portion which can be configured (of course, cross-sectional shapes themselves are different similarly to the upper side portion and the vertical side portion) by the same technical idea as the first embodiment while being made to correspond to the shape of the upper side portion and the vertical side portion is omitted.

The glass run channel assembly 250 related to the second embodiment is a glass run channel assembly with which is mounted to a panel door frame 310 molded integrally with a door panel by press working. First, the configuration of the upper side portion 260, and the structure of the upper frame 314 to which the upper side portion 260 is mounted will be described referring to the drawings.

Figure 9:
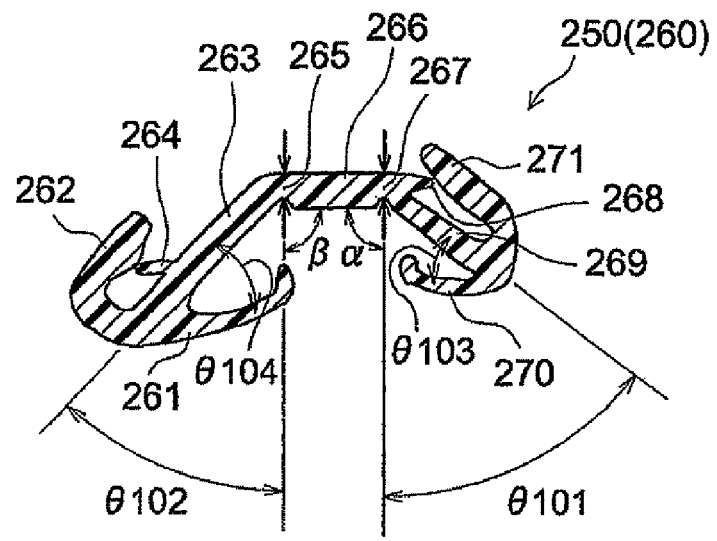
FIG. 9 is a sectional view showing a cross-sectional shape of an upper side portion after extrusion molding of the glass run channel assembly according to a second embodiment of the invention.
Figure 10:
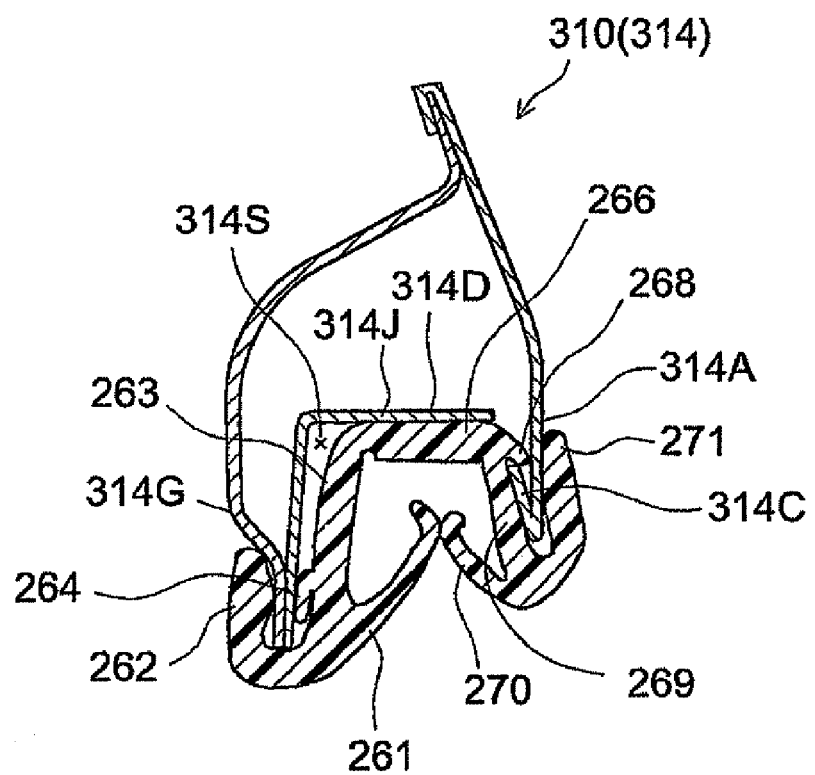
FIG. 10 is a sectional view showing the cross-sectional shape of the upper side portion of the glass run channel assembly according to the second embodiment in the state of being mounted to the upper frame.

FIG. 9 is a sectional view showing the cross-sectional shape of the upper side portion 260 of the glass run channel assembly 250 related to the second embodiment. FIG. 10 is a cross-sectional view showing the state where the upper side portion 260 is mounted into a groove 314S of the upper frame 314 of the door frame 310 (although the front door frame is shown here, the same is true on the rear door frame).

First, the structure of the upper frame 314 (the same is true on the upper frame of the rear door frame (not shown)) will be described. As shown in FIG. 10, the upper frame 314 is formed such that an interior side wall 314G and an exterior side wall 314A are arranged substantially parallel to each other in the width direction of the car. An L-shaped stopper member 314D is fixed by welding to the interior side wall 314G. A groove 314S is formed between the exterior side wall 314A and the stopper member 314D along the frame. Specifically, the periphery of the groove 314S within the upper frame 314 is constituted by the exterior side wall 314A, an interior side wall of the stopper member 314D, and a bottom wall 314J of the stopper member 314D. Additionally, the tip of the exterior side wall 314A is bent toward the groove 314S along the longitudinal direction to form an engagement tip 314C.

As shown in FIGS. 9 and 10, the upper side portion 260 of the glass run channel assembly 250 related to the second embodiment generally has a bottom wall portion 266 arranged in a position which faces an outer peripheral end face 3AA (refer to FIG. 5) of the windowpane 3A, an interior side wall portion 263 which protrudes via an interior connection 265 from an interior end in a width direction of the bottom wall portion 266, and an exterior side wall portion 269 which protrudes via an exterior connection 267 from an exterior end in the width direction of the bottom wall portion 266. As shown in FIG. 9, the interior connection 265 and the exterior connection 267 are formed so as to have a smaller thickness than the adjacent bottom wall portion 266 or both the interior and exterior side wall portions 263 and 269 such that they can be bent when being mounted on the door frame 310 (refer to opposed arrows in FIG. 9).

Typically, the upper side portion 260 is formed from vulcanized elastic rubber (typically, a material composed mainly of ethylene propylene diene rubber (EPDM rubber)) such that the coefficient of static friction with the door frame 310 (upper frame 314) becomes a predetermined value ($\mu 1$). For example, the long upper side portion is obtained by performing extrusion, using a rubber material for extrusion obtained by blending EPDM (here, 100 parts by mass), carbon black (here, 120 parts by mass), process oil (here, 80 parts by mass various kinds of vulcanizing agents (here, 1 part by mass of sulfur), various kinds of fillers (here, 30 parts by mass of talc), various kinds of vulcanization accelerators (here, 2 parts by mass), and the like, and performing heat-treating (for example, about 200° C.) to vulcanize the extrudate. Although not particularly limited, when this kind of material is used, a molded body whose static friction coefficient (μ1) is about equal to or more than 1.1 and less than 1.7 (typically 1.4±0.1) can be formed.

As shown in FIG. 9, in a state before the glass run channel assembly is mounted to the door frame 310, an extrusion-molded body which constitutes the upper side portion 260 has an expanded, substantially U-shaped constant cross-sectional shape by the bottom wall portion 266 and both the interior and exterior side wall portions 263 and 269. Moreover, as shown in this drawing, an interior seal lip 261 and an exterior seal lip 270 which extend in a folded-back shape toward the bottom wall portion 266 integrally from protruding tips of the interior side wall portion 263 and the exterior side wall portion 269 while holding a space to the side wall portions 263 and 269 are provided. Moreover, an exterior engagement projection ridge 268 is formed at the end of the exterior side wall portion 269 near the bottom wall portion 266 so as to project outward. Meanwhile, an interior engagement projection ridge 264 is formed at the outer surface near the protruding tip of the interior side wall portion 263 so as to project outward.

Moreover, as shown in the drawing, concealing lips (an interior concealing lip 262 and an exterior concealing lip 271) are respectively and integrally formed at protruding tips of the exterior side wall portion 269 and interior side wall portion 263 of the upper side portion 260. These concealing lips extend toward the side opposite to the seal lips 261 and 270 in a folded-back shape while holding a space to the side wall portions, cover the inner peripheral edge (that is, the side wall 314A or 314G) of the door frame 310 (the upper frame 314) from the outside when being mounted to the door frame 310 (the upper frame 314), and is able to be elastically deformed to grip the inner peripheral edge (the side wall 314A or 314G) in conformity with the side wall portion 263 or 269 when being mounted to the door frame 310.

Similarly to the first embodiment, the upper side portion 260 of the glass run channel assembly 250 related to the second embodiment is extrusion-molded such that the relative positional relationship, i.e., angle, of the aforementioned respective constituent portions is adjusted as indicated by θ in FIG. 9. Specifically, the cross-sectional shape after extrusion is adjusted such that the angle θ103 between the exterior side wall portion 269 and the exterior seal lip 270 becomes about 35° and the angle θ104 between the interior side wall portion 263 and the interior seal lip 261 becomes 35°.

Moreover, with respect to the cross-sectional shape of the upper side portion 260, each of the interior side wall portion 263 and the exterior side wall portion 269 is deformed to a U-shape in which the expansion degree of the expanded U-shape before the mounting is reduced with the bent elastic deformation of the connections 265 and 267 (here, a U-shape in which the angle α between the bottom wall portion 266 and the exterior side wall portion 269 after mounting to the upper frame 314 is about 90°, and the angle β between the bottom wall portion 266 and the interior side wall portion 263 is considering it as the shape of a U-shape which is about 90°) after being mounted (refer to FIG. 10) along the upper frame 314 of the front door frame 310 from the expanded substantial U-shape (FIG. 9) after extrusion molding. In the second embodiment, such an elastic deformation angle is adjusted such that a predetermined elastic force (f1) is obtained in portions where the interior side wall portion 263 and the exterior side wall portion 269 contact the upper frame after mounting to the door frame 310 (the upper frame 314). Here, the elastic deformation angle θ101 of the exterior side wall portion 269 is set to about 50°, and the elastic deformation angle θ102 of the interior side wall portion 263 is set to about 50°. That is, as is clear from the angles indicated by the above α and β and the angles indicated by the above θ101 and θ102, in the second embodiment, the glass run channel assembly is formed such that both the intersection angle (α+θ101=140°) between the bottom wall portion 266 of the upper side portion 260 and the exterior side wall portion 269 and the intersection angle (β+θ102=140°) between the bottom wall portion 266 of the upper side portion 260 and the interior side wall portion 263 are an obtuse angle in a state before the glass run channel assembly is mounted to the door frame 310 (refer to FIG. 9).

Additionally, in the second embodiment, the thickness of the exterior connection 267 of the aforementioned upper side portion 260 is made larger than the thickness of the exterior connection 287 of the vertical side portion 280 which will be described later, and the thickness of the interior connection 265 of the upper side portion 260 is also made larger than the thickness of the interior connection 285 of the vertical side portion 280.

By adjusting and setting various conditions as described above, the cross-sectional shape of the upper side portion 260 related to the second embodiment is adjusted such that the frictional force per unit length obtained by multiplying the coefficient μ1 of static friction of the upper side portion 260 with the upper frame 314 by the elastic force f1 is relatively larger than the frictional force per unit length obtained by multiplying the coefficient μ2 of static friction of the vertical side portion 280 (the same is true on the partition side portion (not shown)), which will be described later, with the vertical frame 312 by the elastic force f2.

Thus, the upper side portion 260 of the above configuration, as shown in FIG. 10, is mounted into the groove 314S upward from below the upper frame 314 while being elastically deformed from the expanded U-shape to the reduced U-shape as described above due to the elastic deformation that the interior and exterior connections 265 and 267 are curved in a bent shape. At this time, as shown in FIG. 10, the interior side wall portion 263 and the exterior side wall portion 269 which have been elastically deformed are pressed against the interior side wall 314G and the exterior side wall 314A, respectively, by the predetermined elastic force (f1). Here, the upper side portion 260 related to the second embodiment is formed from a vulcanized elastic rubber (typically, a material composed mainly of ethylene propylene diene rubber (EPDM rubber)) as described above. Thus, in this mounting part, the upper side portion is made of elastic rubber whose static friction coefficient is lower than that of a conventional glass run channel assembly which is molded from TPO in whole. Therefore, the mounting operation to the door frame 310 becomes easy, and the load (fatigue) given to a mounting operator can be made small. Specifically, the operation of mounting a glass run channel assembly upward from below the upper frame 314 is the operation which forces a burden upon an operator more than a case where the glass run channel assembly is mounted downward from above or laterally. However, since the upper side portion 260 is made of elastic rubber whose static friction coefficient is low, it becomes easy to mount the glass run channel assembly upward from below the upper frame 314.

Additionally, in this mounting part, the upper side portion 260 is made of the above elastic rubber with smaller creep deformation unlike the glass run channel which is molded from TPO. Therefore, the frictional force generated between the upper side portion 260 and the upper frame 314 (including the inclination frame portion (refer to FIG. 1) which is not shown) can be kept larger than that of a glass run channel which is molded from TPO in whole after lapse of predetermined time after mounting. Accordingly, in this mounting part, occurrence of an unexpected positional deviation of the glass run channel assembly 250 accompanying the operation of the windowpane 3A which moves up and down can be prevented over a prolonged period of time.

In addition, as described in the first embodiment, it is preferable that a low friction material layer (not shown) whose static friction coefficient is lower than that of the bottom wall portion 266 be continuously formed in a longitudinal direction in the portion of the bottom wall portion 266 of the upper side portion 260 which faces the outer peripheral end face 3AA of the windowpane 3A. In addition, it is preferable that a low friction material layer whose static friction coefficient is low be continuously formed in the longitudinal direction even in the outer surfaces of the interior and exterior seal lips 261 and 270 which can contact the windowpane 3A. This is the same as the first embodiment.

Additionally, according to the upper side portion 260 related to the second embodiment, the above interior engagement projection ridge 264 contacts the inner surface of the stopper member 314D by elastic rebounding after mounting. In addition, the exterior engagement projection ridge 268 contacts the exterior side wall 314A, and engages the engagement tip 314C. This can prevent slip-off of the upper side portion 260 from the upper frame 314 more reliably.

Figure 13:
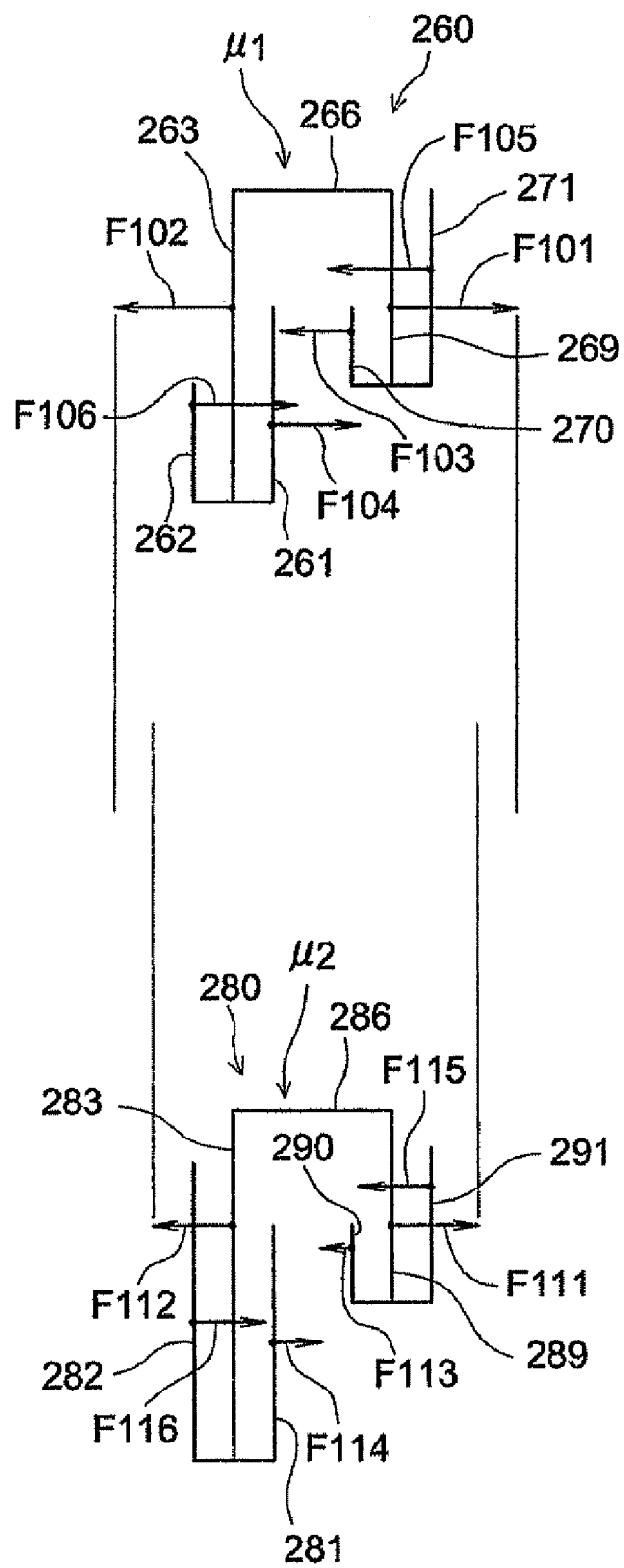
FIG. 13 is an explanatory view schematically showing an elastic force generated in each part of the glass run channel assembly according to the second embodiment after being mounted to a door frame.

Furthermore, according to the upper side portion 260 related to the second embodiment, during mounting, the exterior side wall portion 269 and the interior side wall portion 263 can be drawn near to the exterior inner peripheral edge (that is, the exterior side wall 314A) and interior inner peripheral edge (that is, the inner surface of the stopper member 314D) of the door frame 310 (the upper frame 314), respectively, by the elastic force generated by the elastic deformation of the above concealing lips 271 and 262. This can generate much larger elastic force (in other words, pressing force) (refer to FIG. 13 which will be described later) in addition to the elastic forces of the exterior side wall portion 269 and interior side wall portion 263. Accordingly, a high frictional force can be generated between the upper side portion 260 and the upper frame 314 of the door frame 310, and occurrence of an unexpected positional deviation of the glass run channel assembly 250 accompanying the operation of the windowpane which moves up and down can be prevented more reliably. Additionally, the concealing lips 271 and 262 can conceal a gap created between the interior side wall 314G and the exterior side wall 314A of the upper frame 314, and the upper side portion 260.

Figure 11:
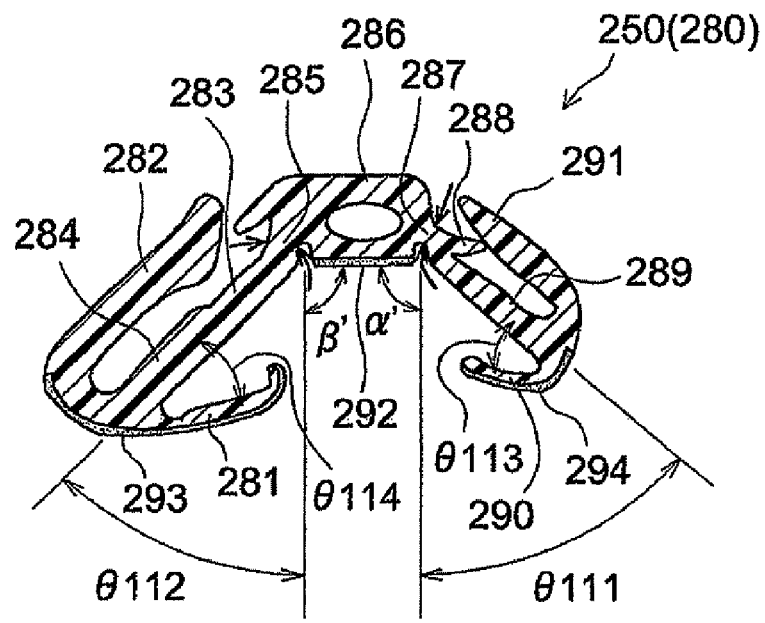
FIG. 11 is a sectional view showing a cross-sectional shape of a vertical side portion after extrusion molding of the glass run channel assembly according to the second embodiment.

First, the configuration of the vertical side portion 280, and the structure of the vertical frame 312 to which the vertical side portion 280 is mounted will be described referring to the drawings. In addition, since the configuration of the partition side portion (not shown) and the structure of the partition frame are almost the same as the configuration of the vertical side portion 280, and the structure of the vertical frame 312 to which the vertical side portion 280 is mounted, the duplicate description thereof is omitted. The cross-sectional shape of the vertical side portion 280 after extrusion molding (that is, before being mounted to the door frame 310) is shown in FIG. 11. Additionally, FIG. 12 is a sectional view showing a state where the vertical side portion 280 is mounted to the vertical frame 312.

Figure 12:
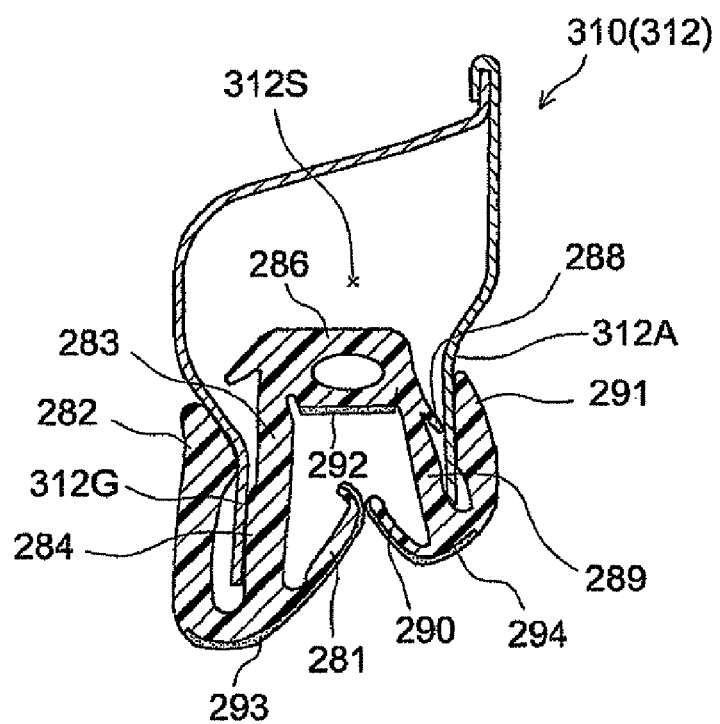
FIG. 12 is a sectional view showing the cross-sectional shape of the vertical side portion of the glass run channel assembly according to the second embodiment in the state of being mounted to a vertical frame.

As shown in FIG. 12, the vertical frame 312 is formed such that an interior side wall 312G and an exterior side wall 312A are arranged substantially parallel to each other in the width direction of the car, and a groove 312S is formed between the two side walls 312A and 312G along the frame.

As shown in FIGS. 10 and 11, the vertical side portion 280 of the glass run channel assembly 250 related to the second embodiment generally has a bottom wall portion 286 arranged in a position which faces an outer peripheral end face 3AA of the windowpane 3A, an interior side wall portion 283 which protrudes via an interior connection 285 from an interior end in a width direction of the bottom wall portion 286, and an exterior side wall portion 289 which protrudes via an exterior connection 287 from an exterior end in the width direction of the bottom wall portion 286. As shown in FIG. 11, the interior connection 285 and the exterior connection 287 are formed so as to have a smaller thickness than the adjacent bottom wall portion 286 or both the interior and exterior side wall portions 283 and 289 such that they can be bent when being mounted on the door frame 310 (the vertical frame 312) (refer to opposed arrows in FIG. 11).

Typically, the vertical side portion 280 is formed from an olefin system thermoplastic elastomer (TPO) such that the coefficient of static friction with the front door frame 310 becomes a larger value ($\mu 2$) than the above static friction coefficient $\mu 1$ in the upper side portion 260. For example, the vertical side portion and the partition side portion are preferably obtained using various TPO products (for instance, TPO materials sold by AES Japan, Inc. (for example, trade name: Santoprene (registered trademark) 121-67W)) which are commercially available. Although not particularly limited, when this kind of material is used, a molded body whose static friction coefficient ($\mu 2$) is about equal to or more than 1.7 and less than 2.0 (typically 1.8±0.1) can be formed.

As shown in FIG. 11, in a state before the glass run channel assembly is mounted to the door frame 310, an extrusion-molded body which constitutes the vertical side portion 280 has an expanded, substantially U-shaped constant cross-sectional shape by the bottom wall portion 286 and both the interior and exterior side wall portions 283 and 289. Moreover, as shown in this drawing, an interior seal lip 281 and an exterior seal lip 290 which extend in a folded-back shape toward the bottom wall portion 286 integrally from protruding tips of the interior side wall portion 283 and the exterior side wall portion 289 while holding a space to the side wall portions 283 and 289 are provided. Moreover, an exterior engagement projection ridge 288 is formed at the end of the exterior side wall portion 289 near the bottom wall portion 286 so as to project outward. Additionally, the portion of the interior side wall portion 283 near the protruding tip is formed so as to have a larger wall thickness than the portion near the bottom wall portion 286 (hereinafter, this portion is referred to as "interior thick wall portion 284".

Moreover, as shown in the drawing, concealing lips (an interior concealing lip 282 and an exterior concealing lip 291) are respectively and integrally formed at protruding tips of the exterior side wall portion 289 and interior side wall portion 283 (interior thick wall portion 284) of the vertical side portion 280. These concealing lips extend toward the side opposite to the seal lips 281 and 290 in a folded-back shape while holding a space to the side wall portions, cover the inner peripheral edge (that is, the side wall 312A or 312G) of the door frame 310 (the vertical frame 312) from the outside when being mounted to the door frame 310 (the vertical frame 312), and is able to be elastically deformed to grip the inner peripheral edge (the side wall 312A or 312G) in conformity with the side wall portion 283 or 289 when being mounted to the door frame 310.

Additionally, low friction material layers 292, 293, and 294 whose static friction coefficients are lower than those of the bottom wall portion 286, the interior seal lip 281, and the exterior seal lip 290 are continuously formed in a longitudinal direction in the portion of the bottom wall portion 286 of the vertical side portion 280 which faces the outer peripheral end face 3AA (refer FIG. 7) of the windowpane 3A, and in the outer surfaces of the interior seal lip 281 and the exterior seal lip 290. Although not particularly limited, as a material which constitutes the low friction material layers 292, 293, and 294, for example, compositions obtained by mixing polypropylene, ultrahigh molecular weight polyethylene, EPDM, silicone oil, etc. can be included.

The vertical side portion 280 of the glass run channel assembly 250 related to the second embodiment is extrusion-molded such that the relative positional relationship, i.e., angle, of the aforementioned respective constituent portions is adjusted as indicated by θ in FIG. 11. Specifically, the cross-sectional shape after extrusion is adjusted such that the angle θ113 between the exterior side wall portion 289 and the exterior seal lip 290 is about 35° and the angle θ114 between the interior side wall portion 283 and the interior seal lip 281 becomes about 35°.

Moreover, with respect to the cross-sectional shape of the vertical side portion 280, each of the interior side wall portion 283 and the exterior side wall portion 289 is changed to a U-shape in which the expansion degree of the expanded U-shape before the mounting is reduced with the bent elastic deformation of the connections 285 and 287 (here, a U-shape in which the angle α' between the bottom wall portion 286 and the exterior side wall portion 289 after mounting to the vertical frame 312 is about 90°, and the angle β' between the bottom wall portion 286 and the interior side wall portion 283 is about 90°) after being mounted (refer to FIG. 12) along the vertical frame 312 of the front door frame 310 from the expanded substantial U-shape (FIG. 11) after extrusion molding. In the second embodiment, such an elastic deformation angle is adjusted such that a predetermined elastic force (f2) is obtained in portions where the interior side wall portion 283 and the exterior side wall portion 289 contact the vertical frame after mounting to the door frame 310 (the vertical frame 312). Here, the elastic deformation angle θ111 of the exterior side wall portion 289 is set to about 45°, and the elastic deformation angle θ112 of the interior side wall portion 283 is set to about 45°.

As is clear from the specific examples of the elastic deformation angles θ111 and θ112, in the glass run channel assembly 250 related to the second embodiment, the respective elastic deformation angles θ102 and θ101 of the interior side wall portion 263 and the exterior side wall portion 269 in the upper side portion 260 are set so as to be larger than the elastic deformation angles θ112 and θ111 of the interior side wall portion 283 and the exterior side wall portion 289 in the vertical side portion 280. That is, the cross-sectional shapes of the upper side portion 260 and the vertical side portion 280 are adjusted so as to realize θ101>θ111 and θ102>θ112.

Herein, the cross-sectional shapes of the upper side portion 260 and the vertical side portion 280 may be adjusted such that a sum of the elastic deformation angles θ101+θ102 is larger than a sum of the elastic deformation angles θ111+θ112.

In the vertical side portion 280 related to the second embodiment, in addition to the relationship between the elastic deformation angles θ101, θ102, θ111, and θ112, the cross-sectional shape of the upper side portion 260 and the vertical side portion 280 are adjusted such that the frictional force per unit length obtained by multiplying the coefficient μ2 of static friction of the vertical side portion 280 with the vertical frame 312 by the elastic force f2 is relatively smaller than the frictional force per unit length obtained by multiplying the coefficient μ1 of static friction of the aforementioned upper side portion 260 with the upper frame 314 by the elastic force f1.

Thus, the vertical side portion 280 of the above configuration, as shown in FIG. 12, is laterally mounted into the groove 312S of the vertical frame 312 while being elastically deformed from the expanded U-shape to the reduced U-shape as described above due to the elastic deformation that the interior and exterior connections 285 and 287 are curved in a bent shape. At this time, as shown in FIG. 12, the interior side wall portion 283 and the exterior side wall portion 289 which have been elastically deformed are pressed against the interior side wall 312G and the exterior side wall 312A, respectively, by the predetermined elastic force (f2). Here, since the vertical side portion 280 related to the second embodiment is formed from a TPO material whose specific gravity is smaller than rubber which constitutes the upper side portion 260, a reduction in weight can be achieved compared with a glass run channel assembly which is molded from rubber in whole. That is, in addition to the prevention of positional deviation of the glass run channel assembly 250 in the vertical frame 312, it is possible to enjoy merits (an improvement in efficiency of conveyance, a reduction in the weight of a vehicle, etc.) by virtue of the reduction in weight.

Additionally, according to the vertical side portion 280 related to the second embodiment, the above interior thick wall portion 284 contacts the inner surface of the interior side wall 312G while being accompanied by elastic rebounding after mounting. In addition, the exterior engagement projection ridge 288 contacts the exterior side wall 312A while being accompanied by elastic rebounding. This can prevent slip-off of the vertical side portion 280 from the inside of the groove 312S more reliably.

Furthermore, according to the vertical side portion 280 related to the second embodiment, after mounting, the exterior side wall portion 289 and the interior side wall portion 283 can be drawn near to the exterior inner peripheral edge (that is, the exterior side wall 312A) of the door frame 310 (the vertical frame 312), and the interior inner peripheral edge (that is, the interior side wall 312G), respectively, by the elastic force generated by the elastic deformation of the above concealing lips 291 and 282. This can generate much larger elastic force (in other words, pressing force) (refer to FIG. 13 which will be described later) in addition to the elastic forces of the exterior side wall portion 289 and interior side wall portion 283. Accordingly, a high frictional force can be generated between the vertical side portion 280 and the vertical frame 312 of the door frame 310, and occurrence of an unexpected positional deviation of the glass run channel assembly 250 accompanying the operation of the windowpane which moves up and down can be prevented more reliably. Additionally, the concealing lips 291 and 282 can conceal a gap created between the interior side wall 312G and the exterior side wall 312A of the vertical frame 312, and the vertical side portion 280.

As described above, in the glass run channel assembly 250 related to the second embodiment, the upper side portion 260 and the vertical side portion 280 (and the partition side portion (not shown)) are formed from materials which are different from each other, and when being mounted along the door frame 310 as described above, both the upper side portion 260 and the vertical side portion 280 are arranged so as to be changed to a shape in which the expansion degree of the above expanded U-shape before mounting in the interior side wall portion 263 or 283 and the exterior side wall portion 269 or 289 is reduced by the elastic deformation of the connections 265, 267, 285, and 287 which are elastically deformed in a bent shape during mounting to the door frame. Also, after mounting to the door frame 310, the cross-sectional shapes of the upper side portion and the vertical side portion are adjusted such that a predetermined elastic force f2 is generated in portions where the interior side wall portion 283 and the exterior side wall portion 289 of the vertical side portion 280 contact the vertical frame 312, and a predetermined elastic force f1 is generated in portions where the interior side wall portion 263 and the exterior side wall portion 269 of the upper side portion 260 contacts the upper frame 314. Moreover, the cross-sectional shape of each of the upper side portion and the vertical side portion is adjusted such that the friction force per unit length obtained by multiplying the coefficient µ1 of static friction of the upper side portion 260 with the upper frame 314 by the elastic force f1 is larger than the frictional force per unit length obtained by multiplying the coefficient µ2 of static friction of the vertical side portion 280 with the vertical frame 312 by the elastic force f2. This relationship is typically shown in FIG. 13. Arrows to which symbols including the capital F in the drawings are given schematically represent the magnitude and direction of elastic forces in respective parts generated after mounting to the door frame vectorially. It is easily understood by the comparison between the magnitudes of vectors (arrow) from this drawing that the elastic force f1 (equivalent to F101 and F102 in FIG. 13) of the portion (specifically, the exterior side wall portion 269 and the interior side wall portion 263) of the upper side portion 260 which contacts the upper frame 314 is larger than the elastic force f2 (equivalent to F111 and F112 in FIG. 13) of the portion (specifically, the exterior side wall portion 289 and the interior side wall portion 283) of the vertical side portion 280 which contacts the vertical frame 312 (that is, F101>F111, F102>F112).

Additionally, the elastic forces (F101 and F102) generated in the exterior side wall portion 269 and the interior side wall 263 of the upper side portion 260 increase as the elastic forces (F105 and F106) generated in the exterior concealing lip 271 and the interior concealing lip 262 are added, respectively. Similarly, the elastic forces (F111 and F112) generated in the exterior side wall portion 289 and the interior side wall 283 of the vertical side portion 280 increase as the elastic forces (F115 and F116) generated in the exterior concealing lip 291 and the interior concealing lip 282 are added, respectively. In addition, F103 and F104 in the drawing respectively represent elastic forces generated in the exterior seal lip 270 and interior seal lip 261 of the upper side portion 260, and F113 and F114 in the drawing respectively represent elastic forces generated in the exterior seal lip 290 and interior seal lip 281 of the vertical side portion 280.

By adopting such a configuration, it is possible to provide the glass run channel assembly 250 which can realize both achievement of a reduction in weight compared with a glass run channel assembly which is extrusion-molded in whole by using an extrusion molding material including a rubber material, and prevention of occurrence of positional deviation in the longitudinal direction of the door frame after being mounted to a given position of the door frame.

Additionally, as described above, in the glass run channel assembly 250 related to the second embodiment, at least one of the elastic deformation angles of the interior side wall portion 263 and the exterior side wall portion 269 in the upper side portion 260 is set so as to be larger than the elastic deformation angles of the interior side wall portion 283 and the exterior side wall portion 289 in the corresponding vertical side portion 280 (here, both θ101>θ111 and θ102>θ112). For this reason, a high frictional force can be generated between the upper side portion 260 and the upper frame 314, and occurrence of an unexpected positional deviation of the glass run channel assembly 250 accompanying the operation of the windowpane 3A which moves up and down can be prevented.

Additionally, as described above, the glass run channel assembly 250 related to the second embodiment is molded such that at least one of the intersection angle (both intersection angles in the second embodiment) between the bottom wall portion 266 and the exterior side wall portion 269 of the upper side portion 260, and the intersection angle between the bottom wall portion 266 and the interior side wall portion 263 of the upper side portion 260 is an obtuse angle in a state before being mounted to the door frame 310. For this reason, a high frictional force can be generated between the upper side portion 260 and the upper frame 314, and occurrence of an unexpected positional deviation of the glass run channel assembly 250 accompanying the operation of the windowpane 3A which moves up and down can be prevented.

Additionally, as described above, the glass run channel assembly 250 related to the second embodiment is formed such that the thickness of the exterior connection 267 of the upper side portion 260 is larger than the thickness of the exterior connection 287 of the vertical side portion 280 and/or the thickness of the interior connection 265 of the upper side portion 260 is larger than the thickness of the interior connection 285 of the vertical side portion 280 (both thicknesses are larger in the second embodiment). For this reason, a larger elastic force than that in the vertical side portion 280 can be generated in the upper side portion 260, a high frictional force can be generated between the upper side portion 260 and the upper frame 314, and occurrence of an unexpected positional deviation of the glass run channel assembly 250 accompanying the operation of the windowpane 3A which moves up and down can be prevented.

In addition, although not shown, in the glass run channel assembly 250 related to the second embodiment, the upper side portion 260 and the vertical side portion 280 is connected integrally in a corner portion in order to maintain integrity in its longitudinal direction. Also, in a state before being mounted along the door frame 310, the corner portion is formed such that the intersection angle between the bottom wall portion and the exterior side wall portion and the intersection angle between the bottom wall portion and the interior side wall portion in the corner portion change so as to become gradually small from the same intersection angle as the upper side portion 260 to the same intersection angle as the intersection angle of the vertical side portion 280 as it approaches from the upper side portion 260 toward the vertical side portion 280.

In addition, although not shown, in the glass run channel assembly 250 related to the second embodiment, the upper side portion 260 and the vertical side portion 280 is connected integrally in a corner portion in order to maintain integrity in its longitudinal direction. Also, the corner portion is formed such that the elastic deformation angles of the interior side wall portion and the exterior side wall portion in the corner portion before being mounted along the door frame 310 change so as to become gradually small from the same elastic deformation angle as the upper side portion 260 to the same elastic deformation angle as the elastic deformation angle of the vertical side portion 280 as it approaches from the upper side portion 260 toward the vertical side portion 280.

By forming the corner portion in this way, it is possible to provide a glass run channel assembly 250 having excellent integrity in the corner portion in the longitudinal direction, and in the vicinity thereof (that is, the end of an adjacent extrusion-molded portion near the corner portion), and easy mounting operation to the door frame 310. Additionally, unexpected deformation does not occur in the corner portion during mounting operation. Accordingly, it is possible to stably mount the glass run channel assembly 250 to the whole frame including the corner portion (that is, the corner frame and the partition frame) of the door frame 310.

Although specific examples of the invention have been described in detail above referring to the drawings, these examples are merely illustrative, and do not limit the claims thereof. The art set forth in the claims includes various alternations and modifications of the specific examples illustrated above.

What is claimed is:

1. A long glass run channel assembly which is made of an elastic polymeric material, and which is capable of being continuously mounted along an inside of a groove of a door frame, the groove being formed between an interior side wall and an exterior side wall arranged substantially parallel to each other in a width direction of a car, the door frame comprising a vertical frame which is arranged in a vertical direction along a center pillar of the car, an upper frame which includes an inclination frame extending obliquely downward along a front pillar or a rear pillar, and a corner frame which integrally connects an upper end of the vertical frame and an end of the upper frame at a side of the center pillar while being made to intersect each other at a predetermined intersection angle, the glass run channel assembly being configured to guide a windowpane which moves up and down within a door when mounted to the inside of the groove, the glass run channel assembly comprising:

a long upper side portion made of a vulcanized elastic rubber whose coefficient of static friction with the door frame is $\mu 1$, and mounted along the upper frame of the door frame;

a long vertical side portion made of an olefin system thermoplastic elastomer whose coefficient of static friction with the door frame is $\mu 2$ larger than $\mu 1$, and mounted along the vertical frame of the door frame; and a corner portion made of a thermoplastic elastomer and mounted along the corner frame of the door frame, wherein each of the upper side portion and the vertical side portion comprises:

a bottom wall at a position to face an outer peripheral end face of the windowpane;

an interior side wall portion protruding from an interior end of the bottom wall in the width direction via a bent interior connection; and an exterior side wall portion protruding from an exterior end of the bottom wall in the width direction via a bent exterior connection, wherein each of the upper side portion and the vertical side portion is formed by extrusion-molding to have a substantially U-shape constant cross-section with the bottom wall and both the interior and exterior side wall portions in a state before being mounted to the door frame, wherein each of the interior side wall portion and the exterior side wall portion has an interior seal lip and an exterior seal lip, each extending in a folded-back shape toward the bottom wall integrally from a protruding tip thereof while holding a space to the side wall portions, wherein, when mounted to the door frame, both the upper side portion and the vertical side portion are changed to a shape in which an expansion degree of the U-shape between the interior side wall portion and the exterior side wall portion before mounting is reduced by the elastic deformation of the bent connections, wherein after mounting, an elastic force f2 is generated at a portion of the vertical side portion which contacts the vertical frame of the door frame, and an elastic force f1 is generated at a portion of the upper side portion which contacts the upper frame of the door frame, and wherein the cross-sectional shapes of the upper side portion and the vertical side portion are adjusted such that the frictional force per unit length obtained by multiplying the coefficient $\mu 1$ of static friction of the upper side portion with the upper frame by the elastic force f1 is larger than a frictional force per unit length obtained by multiplying the coefficient $\mu 2$ of static friction of the vertical side portion with the vertical frame by the elastic force f2.

2. The glass run channel assembly according to claim 1, wherein the cross-sectional shapes are adjusted by varying elastic deformation angle of at least one of the interior side wall portion and the exterior side wall portion when the glass run channel assembly is mounted to the door frame.

3. The glass run channel assembly according to claim 2, wherein the elastic deformation angle of at least one of the interior side wall portion and the exterior side wall portion in the upper side portion is set so as to be larger than any elastic deformation angles of the interior side wall portion and the exterior side wall portion in the vertical side portion.

4. The glass run channel assembly according to claim 3, wherein any elastic deformation angles of the interior side wall portion and the exterior side wall portion in the upper side portion are set so as to be larger than any elastic deformation angles of the interior side wall portion and the exterior side wall portion in the vertical side portion.

5. The glass run channel assembly according to claim 2, wherein a sum of the elastic deformation angles of the interior side wall portion and the exterior side wall portion in the upper side portion are set so as to be larger than a sum of the elastic deformation angles of the interior side wall portion and the exterior side wall portion in the vertical side portion.

6. The glass run channel assembly according to claim 2, wherein the upper side portion and the vertical side portion are connected integrally in the corner portion, and wherein elastic deformation angles in the corner portion before being mounted along the door frame change so as to become gradually small from elastic deformation angles same as that of the upper side portion to elastic deformation angles same as that of the vertical side portion as approaching from the upper side portion toward the vertical side portion.

7. The glass run channel assembly according to claim 1, wherein the cross-sectional shapes are adjusted such that at least one of an intersection angle between the bottom wall and the exterior side wall portion in the upper side portion, and an intersection angle between the bottom wall and the interior side wall portion in the upper side portion is an obtuse angle in a state before the glass run channel assembly is mounted to the door frame.

8. The glass run channel assembly according to claim 7, wherein any of the intersection angle between the bottom wall and the exterior side wall portion in the upper side portion, and the intersection angle between the bottom wall and the interior side wall portion in the upper side portion is an obtuse angle.

9. The glass run channel assembly according to claim 7,
wherein the upper side portion and the vertical side portion are connected integrally in the corner portion, and
wherein an intersection angle in the corner portion in a state before being mounted along the door frame changes so as to change gradually small from an intersection angle same as that of the upper side portion to an intersection angle same as that of the vertical side portion as approaching from the upper side portion toward the vertical side portion.

10. The glass run channel assembly according to claim 1,
wherein the cross-sectional shapes is adjusted such that a thickness of the exterior connection of the upper side portion is larger than the thickness of the exterior connection of the vertical side portion and/or a thickness of the interior connection of the upper side portion is larger than a thickness of the interior connection of the vertical side portion.

11. The glass run channel assembly according to claim 10,
wherein the thickness of the exterior connection of the upper side portion is larger than the thickness of the exterior connection of the vertical side portion and the thickness of the interior connection of the upper side portion is larger than the thickness of the interior connection of the vertical side portion.

12. The glass run channel assembly according to claim 1,
wherein a concealing lip is integrally formed at each of the protruding tips of the exterior side wall portion and interior side wall portion of the upper side portion and vertical side portion, the concealing lip extending toward a side opposite to the seal lips in a folded-back shape while holding a space to the side wall portions, covers an inner peripheral edge of the door frame from the outside, and is able to be elastically deformed to grip the inner peripheral edge with the side wall portion when being mounted to the door frame, and
wherein when being mounted to the door frame, the exterior side wall portion and the interior side wall portion are drawn to an exterior inner peripheral edge and an interior inner peripheral edge of the door frame by the elastic force generated by the elastic deformation of the concealing lips, respectively.

13. The glass run channel assembly according to claim 1,
wherein a low friction material layer whose static friction coefficient is lower than that of the bottom wall is continuously formed on a portion of the bottom wall of the upper side portion which faces the outer peripheral end face of the windowpane, and
wherein low friction material layers whose static friction coefficients are lower than those of the bottom wall, the interior seal lip, and the exterior seal lip are continuously formed in the longitudinal direction on a portion of the bottom wall of the vertical side portion which faces the outer peripheral end face of the windowpane, and on surfaces of the interior seal lip and the exterior seal lip of the vertical side portion.

14. A long glass run channel assembly which is made of an elastic polymeric material, and which is capable of being continuously mounted along an inside of a groove of a door frame, the groove being formed between an interior side wall and an exterior side wall arranged substantially parallel to each other in a width direction of a car, the door frame comprising a vertical frame which is arranged in a vertical direction along a center pillar of the car, an upper frame which includes an inclination frame extending obliquely downward along a front pillar or a rear pillar, and a corner frame which integrally connects an upper end of the vertical frame and an end of the upper frame at a side of the center pillar while being made to intersect each other at a predetermined intersection angle, the glass run channel assembly being configured to guide a windowpane which moves up and down within a door when mounted to the inside of the groove, the glass run channel assembly comprising:
 a long upper side portion made of a vulcanized elastic rubber and mounted along the upper frame of the door frame;
 a long vertical side portion made of an olefin system thermoplastic elastomer and mounted along the vertical frame of the door frame; and
 a corner portion made of a thermoplastic elastomer and mounted along the corner frame of the door frame,
 wherein each of the upper side portion, the vertical side portion and the corner portion comprises:
  a bottom wall;
  an interior side wall portion protruding from an interior end of the bottom wall in a direction intersecting the bottom wall by a first angle; and
  an exterior side wall portion protruding from an exterior end of the bottom wall in a direction intersecting the bottom wall by a second angle,
 wherein the side wall portions of the upper side portion are continuously connected to the side wall portions of the vertical side portion via the side wall portions of the corner portion, respectively,
 wherein a sum of the first angle and the second angle in the upper side portion is larger than a sum of the first angle and the second angle in the vertical side portion, and a sum of the first angle and the second angle in the corner portion varies gradually.

15. The glass run channel assembly according to claim 14,
wherein thicknesses of the interior end and the exterior end of the bottom wall in the upper side portion are larger than any thicknesses of the interior end and the exterior end of the bottom wall in the vertical side portion.

* * * * *